United States Patent
Goei

(10) Patent No.: US 10,960,782 B2
(45) Date of Patent: Mar. 30, 2021

(54) METHOD AND DEVICE FOR CONVERTING STANDALONE EV CHARGING STATIONS INTO INTELLIGENT STATIONS WITH REMOTE COMMUNICATIONS CONNECTIVITY AND CONTROL

(71) Applicant: Power Hero Corp., La Verne, CA (US)

(72) Inventor: Esmond Goei, Blaine, WA (US)

(73) Assignee: POWER HERO CORP., La Verne, CA (US)

( * ) Notice: Subject to any disclaimer, the term of this patent is extended or adjusted under 35 U.S.C. 154(b) by 169 days.

(21) Appl. No.: 16/279,426

(22) Filed: Feb. 19, 2019

(65) Prior Publication Data
US 2019/0255963 A1   Aug. 22, 2019

Related U.S. Application Data

(60) Provisional application No. 62/632,208, filed on Feb. 19, 2018.

(51) Int. Cl.
*B60L 53/30* (2019.01)
*B60L 53/68* (2019.01)
(Continued)

(52) U.S. Cl.
CPC ............. *B60L 53/305* (2019.02); *B60L 53/12* (2019.02); *B60L 53/16* (2019.02); *B60L 53/63* (2019.02);
(Continued)

(58) Field of Classification Search
CPC ...................................................... B60L 53/305
(Continued)

(56) References Cited

U.S. PATENT DOCUMENTS

| 4,309,644 A | 1/1982 | Reimers et al. |
| 9,180,783 B1 | 11/2015 | Penilla et al. |

(Continued)

OTHER PUBLICATIONS

PCT: International Search Report and Written Opinion of PCT/US2019/018551 (related application); dated May 29, 2019; 12 pgs.
(Continued)

*Primary Examiner* — Edward Tso
*Assistant Examiner* — Ahmed H Omar

(57) ABSTRACT

An adapter converts a dumb charger into a smart charger. A first input interface interconnects the adapter with a first charging connector of a charger. A second input interface interconnects the adapter with a second charging connector of an electric device. A wireless communications interface provides wireless connectivity to the adapter that is initiated responsive to connection of the first input interface with the first charging connector of the charger. Control circuitry interconnects the first input interface with the second input interface via a signaling connection for providing communications between the first input interface and the second input interface. The control circuitry further provides a power connection for selectively providing a charging signal from the first input interface to the second input interface responsive to commands received over the wireless communications interface and the signaling connection.

24 Claims, 11 Drawing Sheets

(51) Int. Cl.
  *B60L 53/16* (2019.01)
  *B60L 53/66* (2019.01)
  *B60L 53/67* (2019.01)
  *B60L 53/12* (2019.01)
  *B60L 53/63* (2019.01)
  *B60L 53/80* (2019.01)

(52) U.S. Cl.
  CPC ............. *B60L 53/66* (2019.02); *B60L 53/665* (2019.02); *B60L 53/67* (2019.02); *B60L 53/68* (2019.02); *B60L 53/80* (2019.02)

(58) Field of Classification Search
  USPC ........................................................ 320/109
  See application file for complete search history.

(56) References Cited

U.S. PATENT DOCUMENTS

| | | | |
|---|---|---|---|
| 2009/0140700 A1 | 6/2009 | Eberhard et al. | |
| 2011/0270476 A1* | 11/2011 | Doppler | H02J 7/00 701/22 |
| 2013/0110296 A1* | 5/2013 | Khoo | G06Q 20/24 700/286 |
| 2013/0217409 A1 | 8/2013 | Bridges et al. | |
| 2017/0282736 A1* | 10/2017 | Goei | B60L 53/65 |

OTHER PUBLICATIONS

PCT: International Preliminary Report on Patentability of PCT/US2019/018551 (related application); Yukari Nakamura; dated Aug. 27, 2020; 11 pages.

\* cited by examiner

METHOD AND DEVICE FOR CONVERTING STANDALONE EV CHARGING STATIONS INTO INTELLIGENT STATIONS WITH REMOTE COMMUNICATIONS CONNECTIVITY AND CONTROL

CROSS-REFERENCE TO RELATED APPLICATIONS

This application claims benefit of U.S. Provisional Application No. 62/632,208, filed Feb. 19, 2018, entitled A METHOD AND DEVICE FOR CONVERTING STANDALONE EV CHARGING STATIONS INTO INTELLIGENT STATIONS WITH REMOTE COMMUNICATIONS CONNECTIVITY AND CONTROL, which is incorporated by reference herein in its entirety.

TECHNICAL FIELD

The present invention relates to the charging of electrically powered devices, and more particularly, to a device for converting a dumb charging system into a smart charging system.

BACKGROUND

The expanding uses of personal rechargeable electrical and electronic devices often require multiple rechargings of batteries within the devices during the course of daily usage. These devices include things such as mobile phones, tablets, personal entertainment devices, personal mobility devices and electric vehicles. With the advent of thousands of mobile phone applications, the rate of battery discharge in mobile phones has increased and popularize the use of portable power banks which accompanied the user to enable the charging of the mobile phone while the user continues their activity. However, in the case of larger sized tablet devices, these devices must often be left unattended at an electrical outlet. Similar problems are encountered with respect to portable medical devices such as a portable oxygen concentrator or respirator. These problems are also encountered with larger electrical devices such as an electric wheelchair or personal mobility device wherein the method of recharging the batteries of the device is restricted to charging at an electrical wall outlet. Depending on the user's state of disability the user may be confined to their electric wheelchair or personal mobility device for the time that the battery requires charging. The user would then have to wait within the chair during the entire charging process.

The aging of the population has seen a continued increase in the number of people with disabilities that can be alleviated by the use of rechargeable electrical devices such as portable oxygen concentrators (POCs) for people with chronic breathing difficulties, or electric wheelchairs for people with a mobility disability. Besides this aging population group, commonly referred to as the "Boomer" generation, many individuals may also be afflicted at younger ages due to injury, illness or birth disability.

Municipalities worldwide are responding to the need to provide transportation and pathways that are accessible by personal mobility device (PMD) users with wheelchairs or electric scooters. The main consumption of battery power by a PMD may begin at the destination point when the user engages in one or more activities that prompted the trip or journey in the first place. As an individual ventures out of his/her home, it is likely that they desire to visit more than one place around a particular destination point. For example, once the individual reaches a mall, they are likely to traverse the mall and visit various in-mall destinations. As the user visits the various places, the electric wheelchair or scooter is consuming battery power, and the PMD user must be conscious of the time passage. The level of residual battery charge may be used up causing the PMD to run out of battery power unexpectedly. When a PMD is drained of battery power, the user is greatly inconvenienced as PMDs can weigh 300 pounds or more and are much too heavy to push and manipulate manually. Additionally, the complete draining of the battery's power causes permanent damage to the battery which shortens battery life and which are expensive to replace. It is commonly recommended that the battery should never be drained below 60% of its capacity, and more recently, it has been recommended that such batteries be frequently charged and maintained close to full capacity. This creates a problem with public venues that are not equipped to provide electrical outlets for charging of devices, much less an electric PMD. Nor are the venue operators incentivized to provide electricity for free.

Similar types of problems arise with electrically powered cars when traveling longer distances from their homes. Electrically powered cars typically have a range of approximately 70-100 miles and some models with a range of over 300 miles. When going on longer trips or attempting to travel cross country, there is a similar need for periodic charging of the car in order to continue on the trip. Thus, some manner for preplanning and reserving charging opportunities would provide greater peace of mind to the electric vehicle traveler.

Although electric vehicles ("EV(s)") are becoming more popular, access to public charging stations remains the number one barrier to EV adoption. The high cost of installing and equipping EV charging stations ("EV Station(s)") with one or more EV chargers hinders the construction and deployment of EV Stations. In addition, most if not all EV stations are unmanned and thus the availability of the station's EV charger(s) is unknown until an EV driver arrives to use the chargers at the particular EV Station; as the equipment may be in use, or inoperative.

SUMMARY

The present invention, as disclosed and described herein, in one aspect thereof, comprises an adapter that converts a dumb charger into a smart charger. A first input interface interconnects the adapter with a first charging connector of a charger. A second input interface interconnects the adapter with a second charging connector of an electric device. A wireless communications interface provides wireless connectivity to the adapter that is initiated in response to connection of the first input interface with the first charging connector of the charger. Control circuitry interconnects the first input interface with the second input interface via a signaling connection for providing communications between the first input interface and the second input interface. The control circuitry responsive to commands received over a wireless communications interface further provides the appropriate signaling protocol to the charger via the first input interface that controls the activation of power by the charger to the electric device being charged.

BRIEF DESCRIPTION OF THE DRAWINGS

For a more complete understanding, reference is now made to the following description taken in conjunction with the accompanying Drawings in which.

DETAILED DESCRIPTION

Figure 1:
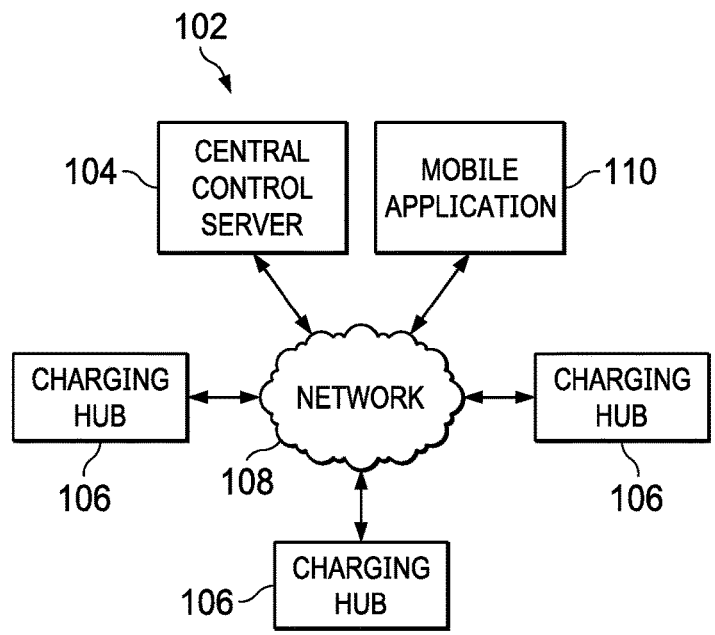
FIG. 1 illustrates a generic system for managing and reserving charging stations.

Referring now to the drawings, wherein like reference numbers are used herein to designate like elements throughout, the various views and embodiments of an automated system for managing a network of charging stations are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 illustrates a generic representation of an electrical device charging management system 102. The system 102 includes a central control server 104 that is responsible for providing centralized management of the charging management system responsive to a variety of system inputs. The central control server 104 manages a number of charging hubs 106 that it communicates with via a network 108 such as the Internet. The charging hubs 106 include one or more charging ports that enable an electrically powered device to be connected and charged. The central control server 104 stores a variety of information related to registered system users and their associated electrically powered devices that are to be charged at the charging hubs 106. The information collected and stored can be used for reserving charging hubs 106, controlling the charging periods of the electrically powered device connected to the charging hub 106 and for enabling payment of charging services provided by the charging hubs. The users of the system are able to interact with the central control server 104 using a mobile application 110 that is stored upon a mobile device such as a smart phone, a tablet, a laptop, personal data assistants, etc. that belongs to the user and provides the ability to interconnect with the central control server 104 via the connecting network 108 such as the Internet. The mobile application 110 would be downloaded onto the users communication device, and the user would register with the central control server 104 enabling the user to make reservations and find information with respect to the variety of charging hubs 106 that are a part of the charging management system 102 or which may be owned by other vendors that are compatible with the system. In such cases the system may only provide management and accounting and payment processes. The mobile application 110 would also enable new vendors that offer the services of charging units to register with the system.

Figure 2:
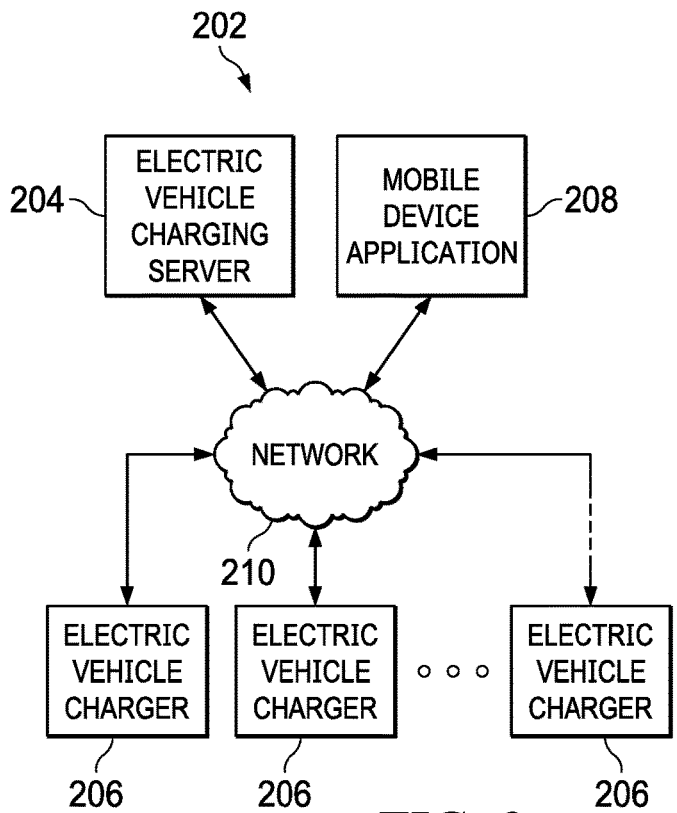
FIG. 2 illustrates an electric vehicle charging management system.

Referring now to FIG. 2, there is more particularly illustrated one embodiment of a charging management system 202 for electric vehicles. The system 202 provides closed loop accounting of the electric vehicle charging process starting from matching the electric vehicle to the charger unit 206, reserving the charger unit, engaging the charger unit, measuring the electricity delivered from the charger unit and collecting and disbursing payment. The electric vehicle charging management system 202 includes an electric vehicle charging control server 204 that controls and manages all system operations enabling user devices to make reservations, connect with and control charging with a variety of electrical vehicle chargers 206. The control server 204 may further enable charging of electrical vehicles by appointment or charging by reservation of other types of portable electric devices. The charging management and reservation system 202 could just as well be applied to non-electric powered vehicles that utilize other types of fuel for power generation such as hydrogen fuel which requires recharging of hydrogen tanks and even gasoline powered cars may benefit from a mechanism for reserving gasoline pumps in certain circumstances such as gasoline rationing which occurred in prior periods of energy crisis. The electric vehicle users are able to interact with the system 202 using a mobile device application 208 installed, for example, on their smartphone. As discussed before, interactions between the control server 204, charging units 206 and mobile device application 108 occur over a central network 210 such as the Internet. A particular electrical vehicle charging unit 206 can provide the chargers and appropriate connections for one or more types of electrical vehicles, such as golf carts, electric motorized wheelchairs, electric shopping carts, etc.

The growing deployment of electric vehicles create a need for widespread electrical charging stations 206 that are conveniently and strategically located at points of interest. The control server 204 enables a network of charging stations 206 to be managed within a wireless/wired automated environment enabling individuals and/or owners of specific brands of electrical vehicles to rent out their chargers 206 for charging compatible electric vehicles. For example, an owner of a Tesla can offer other Tesla drivers the use of their home/premises charging apparatus for a designated fee. The management system 202 is able to match a user with a particular charging station 206 by way of the mobile device application 208. The mobile device application 208 in addition to matching users with charging stations 206 makes use of the central management control system server 204 via the network 210 to enable the dispensation of electricity to the electric vehicles, control various electricity-metering apparatus and provide for an automated reservation, billing and payment processing mechanism for payment of use of the electrical vehicle chargers 206 to enable owners of the electrical vehicle chargers 206 to become a part of the charging management system 202.

Figure 3:
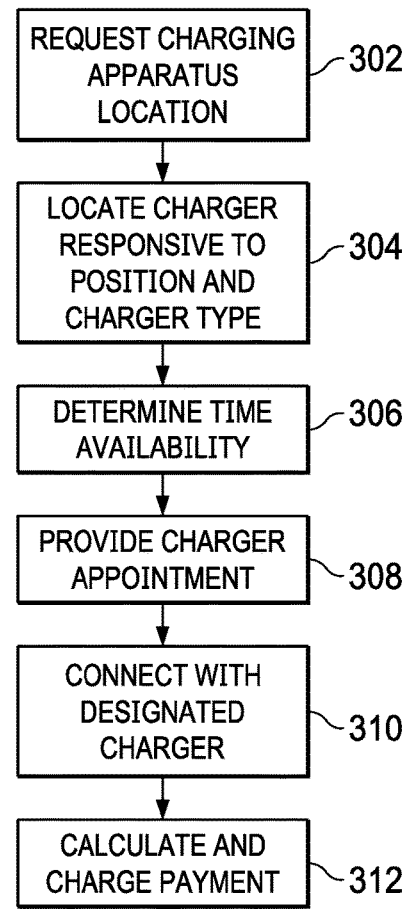
FIG. 3 is a flow diagram illustrating a process for using the electric vehicle charging management system.

Referring now to FIG. 3, there is illustrated a flow diagram describing the use of an electric vehicle charging management system 202 as discussed with respect to FIG. 2. Through the mobile device application 208, a user of an electric vehicle request at step 302 a location of a electric vehicle charger unit 206 that is compatible with their brand of vehicle. The charging control server 204 matches the vehicle to one or more appropriate vehicle chargers 206 at step 304 responsive to the position of the vehicle and the type of charger required to charge the vehicle. Next, the availability of the located chargers 206 is determined at step 306 to determine which of the chargers is available for charging of the vehicle. The time availability may be based upon a requested time or a projected time based upon the travel plan. Upon confirmation of the availability of the charging units 206, the user is to select one of the available charging units 206 and an appointment with the specific charging unit 206 is made by the charging control server 204, and the driver is notified of this appointment through their mobile application 208. Alternatively the user may elect to allow the system to select one of the many available 206 chargers pursuant to preset user preferences or to a system provided artificial intelligence system (AIS) which makes the election for them. Part of the appointment process may involve a full or partial payment being made by the drivers account subject to the charging functionalities of the charging control server 204. The driver may then travel to the designated charging unit 206 to obtain the vehicle charge.

Upon arrival at the designated charging unit 206, the vehicle is connected at step 310 with the designated charger that has been predetermined to be compatible with the particular electric vehicle brand that needs charging. Based on published utility rates, the amount of electricity consumed during the charge process and the location of the charging unit 206, the charging control server 204 can determine the amount to be collected from the registered driver's credit card or other registered payment sources such as PayPal at step 312 to complete payment for the charging services. Determination of electricity consumption can be facilitated by several means and mechanisms including in-line and inductive metering within the charging circuit to the electric vehicle or from data generated by the electric vehicle which may be accessible via Bluetooth or other wireless transmissions. With the advent of smart metering capability installed by utilities to monitor on premise electricity usage the electricity consumed via users using our system such information may be transmitted to our system for usage accounting and billing. Alternatively, the charging profiles from the electric vehicle manufacturer could be automatically referenced to generate an estimate of the electricity consumption that can be billed to the drivers' charging accounts for collection.

Figure 4:
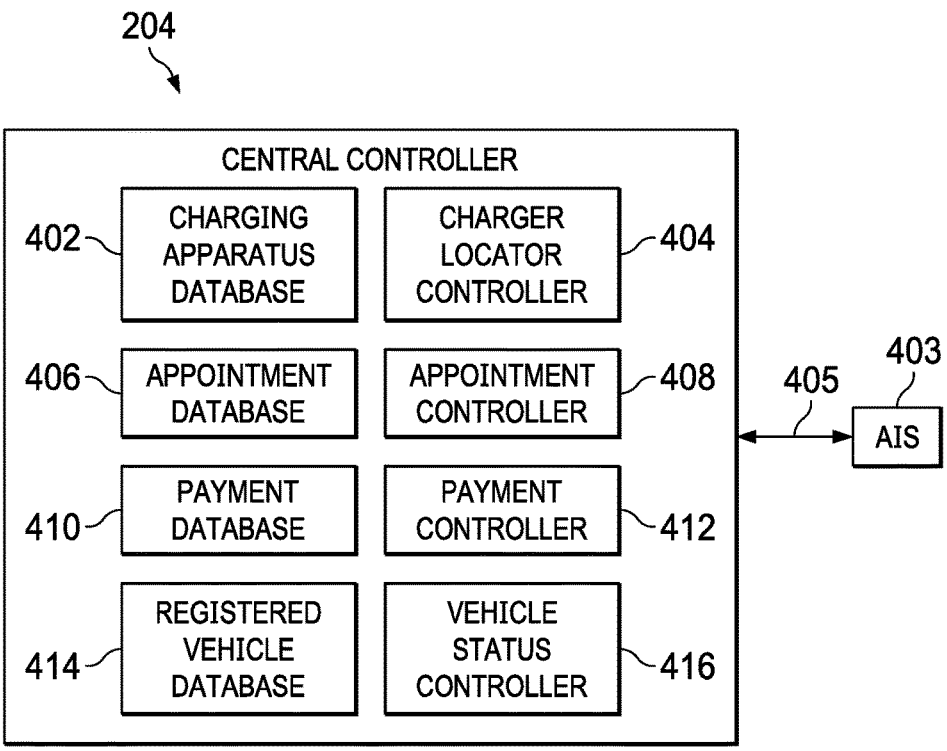
FIG. 4 is a block diagram of a central controller of an electric vehicle charging management system.

Referring now to FIG. 4, there is illustrated a functional block diagram of the charging control server 204. The charging control server 204 includes a charging apparatus database 402 that includes all of the electrical vehicle charging units 206 that have registered with the system for providing charging locations for electric vehicles. The database 402 includes information such as number of charging ports and the types of electric vehicles for which the charging units 206 may be used. Databases within the charging controller server 204 comprise databases that provide data for performing complex real-time matching of the location of an electric vehicle on the road and searching for a charging unit 206 to determine the charging unit that is closest to the vehicle using the charger locator controller 404. More complex matching requests may incorporate destination routing referencing so that the electric vehicle driver may select a charger that is on the way to the electric vehicle's destination, or a mobile charging station that can rendezvous with the electric vehicle. The database 402 may also store information related to the registered electric vehicle such as the last time the electric vehicle was charged, the state of charge to enable the system to estimate the battery exhaustion time and recommended charging locations that an electric vehicle could reach before running out of power. A charger locator controller 404 determines charging units 206 that may possibly be utilized for charging the electrical vehicle based upon information stored within the charging apparatus database 402 and vehicle position and type information provided from the mobile device application 208 of the driver of the electric vehicle. In addition, a link 405 to an AIS 403 may be provided for the purpose of providing more sophisticated trip planning that incorporates various biometric data that may prompt more frequent stops for health necessities or prior user trip patterns. With the pending availability of autonomous vehicle platforms, mobile charging stations will become available and AIS 403 could also be used to coordinate dynamic scheduling of rendezvous points for charging the electric vehicle. The artificial intelligence system 403 may make decisions regarding trip planning without requiring specific user input but by only relying upon provided or monitored system information.

An appointment database 406 stores information for charging appointments that are made by vehicle drivers with respect to particular charging units 206. The appointment database 406 indicates a charging unit 206 and times that the charging unit is presently scheduled to be charging a particular vehicle. An appointment controller 408 generates a listing of possible appointment times for a charging unit 206 to the mobile device application 208 responsive to a user request and receives and stores a user selection for a particular appointment time for a charging unit 206 that a driver has selected.

A payment database 410 stores payment information for registered system users. The payment database 410 stores information required to enable payment for charging sessions via credit card, PayPal, Apple Pay, or other payment mechanisms. The payment controller 412 controls interactions with the mobile device application 208, charging information within the charging control server 204 and the vendor accounts for the charging unit 206 enable transfer of funds from a charging vehicle to a vendor responsible for the charging unit 206 providing a charging session. Various payment schemes may be stored in database 410 such as the use of stored credit resulting from advance deposits or some protocol for a system of membership debits and credits whereby members may opt to accumulate credits by provide charging service to other registered members and are debited when they consume electricity at a registered charging unit 206.

The registered vehicle database 414 maintains information concerning registered users with the system 202. Each registered user would have information concerning their vehicle type enabling assistance in selection of charging units 206 appropriate for that vehicle type. Additionally, the database 414 would include information tying the vehicle to particular charging information and other user or vehicle relevant information. The vehicle status controller 416 monitors operation of the charging operation by a charging unit 206 to which electric vehicle is connected. The charging status controller 416 can monitor the links of a charge and monitor for conditions indicating that ceasing of the battery charge is necessary due to completion of charging or problem issues requiring ceasing of battery charge.

Figure 5:
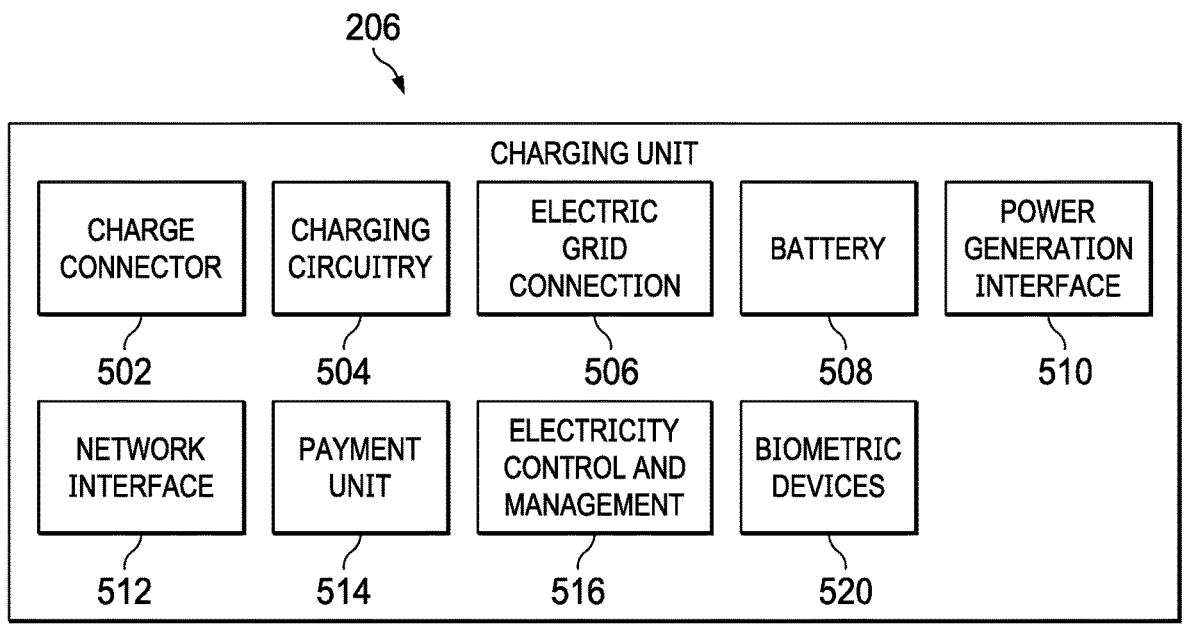
FIG. 5 illustrates a block diagram of a charging unit of an electric vehicle charging management system.

FIG. 5 illustrates a functional block diagram of the charging unit 206. Charging units 206 are available in three classes of performance, level I and II are for residential and commercial installations where single phase AC power is available. Level III electric charging units are required for quick charging of electric vehicles in minutes. Level III charging units utilize three-phase AC power which is usually only available at a business or commercial premises. A typical level I or level II charger will fully charge an electric vehicle in several hours. The charging unit 206 will include a charge connector 502 for connecting one or more different types of electric vehicle to charging circuitry 504. The charging circuitry 504 generates the charging voltage provided to the vehicle. The charge connector 502 can be a single or multiple vehicle connection depending upon the capabilities of the charging unit 206. The charge connector 502 may comprise, but is not limited to, NEMA 15, Tesla, NEMA 50, J1772, SAE Combo, CHADeMO, NEMA 20, etc. connectors.

Charging circuitry 504 utilizes power from either the local power grid or a local battery source to generate a charging current that is output via the charge connector 502 to the electric vehicle being charged. The charging circuitry 504 can receive the charging power from either the electrical power grid via an electric grid connection 506 or a local battery 508. The electric grid connection 506 would comprise a standard power interface to the local power grid. A battery 508 would locally store electricity that was provided via some type of power generation interface 510 or from the electric grid connection 506. The power generation interface 510 could be connected to a solar, wind or other type of power generation system. Alternatively, the system could switch between the alternative power generation interface 510 and the electric grid connection 506 based upon low tariff periods from the electricity grid. Thus, the charging unit 206 would connect to the electric grid during low tariff times and utilize the alternative power generation interface 510 during higher tariff times.

A network interface 512 provides for a wireless or wired connection to the charging control server 204 to enable communications and operations occurring between the databases and controllers therein and the control functionalities within the charging unit 206. The network interface 512 utilizes powerline communications technologies and wireless technologies such as Wi-Fi, 3G/4G data services, GPSS and other mapping technologies. A payment unit 514 comprises an interface for manually entering user information or a credit card reader enabling the taking of point of sale payment information from a driver that desires to charge their electric vehicle. Payment may be taken via cash, check or credit card using the appropriate payment collection protocols, or even membership debits and credits.

Each of the system components are under control of an electricity control and management unit 516 that is responsible for controlling all inter-charging unit operations and operations between the charging unit 206 and the charging control server 204. The electricity control and management unit 516 enables the dispensation of electricity, detects the amount of electricity consumed and transmits this information through the network 210 using mechanisms such as powerline communications, and Wi-Fi, 3G, 4G or other prevalent data networks to the central controller 204 for storage within the various databases. The electricity control and management module 516 includes current sensors on the AC lines connected to the charging vehicle to measure the level of charge being delivered and provide electronic clocks that may be used to measure the duration of electricity dispensation. Information collected, used and transmitted during and after the matching process includes data on the electric vehicle connector type, the charging units characteristics, local utility electricity rates, electric vehicle identification protocols, dispensation duration, as well as characteristics of the charger behavior which may affect maintenance of the charger, etc. Alternatively, a fixed amount of charge can be implemented in discrete blocks of time, for example 30 minute increments, to control the electricity dispensation using a simple timer switch.

Biometric devices 520 may also be used for validating a user connecting with the charging unit 206 and enabling initiation of the charging process. The biometric devices 520 may comprises devices such as fingerprint scanners, voice recognition devices, retinal scanners, etc.

Figure 6:
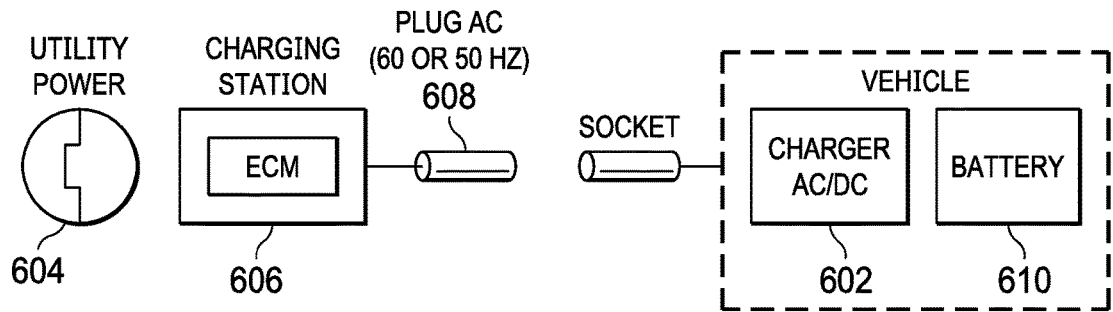
FIG. 6 illustrates an AC coupled charging unit.
Figure 7:
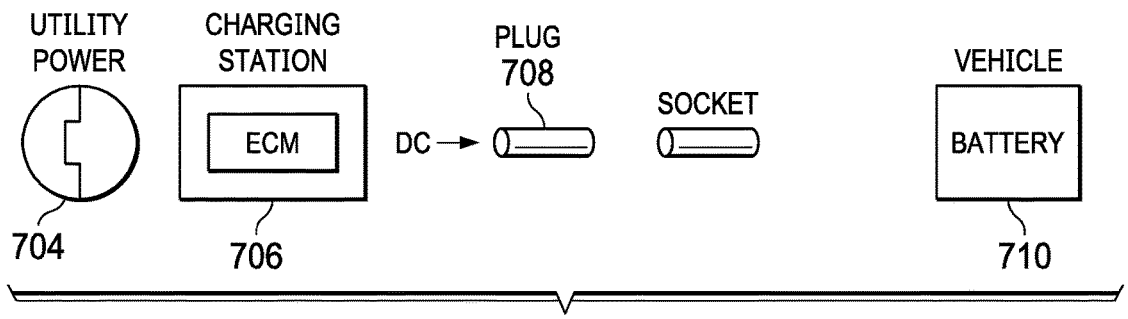
FIG. 7 illustrates a DC coupled charging unit.
Figure 8:
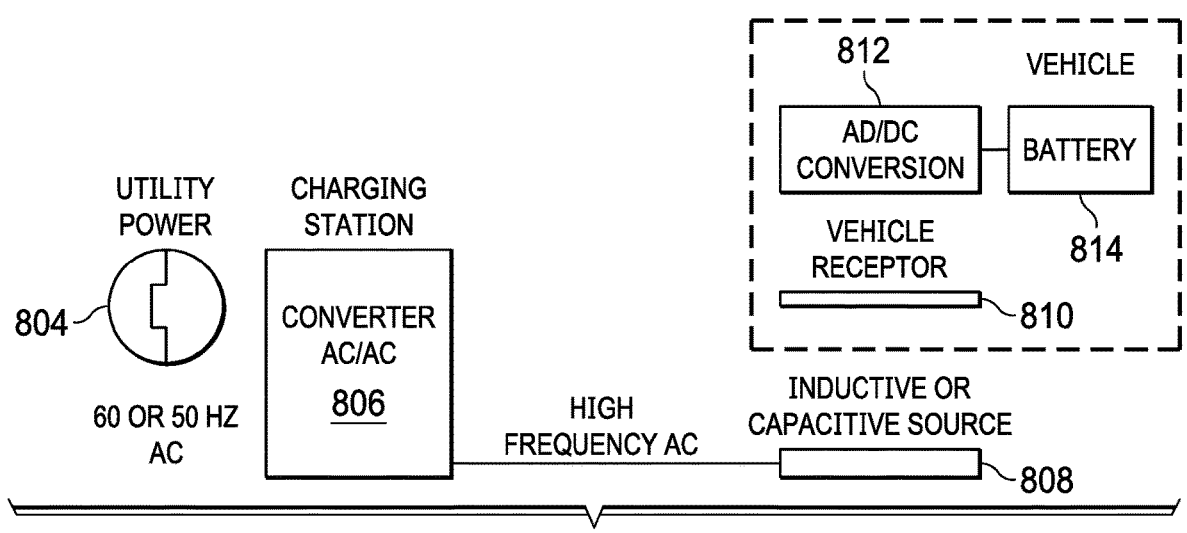
FIG. 8 illustrates an inductively or capacitively coupled charging unit.

Referring now to FIGS. 6-8, there are illustrated components of the system for three different modes of coupling between the electric vehicle with a converter depending on the electric vehicle's onboard electricity storage system. As shown in FIG. 6, if the electric vehicle has a built-in converter 602 to convert the incoming AC power from the utility power 604 into DC power, the charging station 606 only needs to output AC power with the appropriate connector plug 608 voltage to charge the battery 610. If the electric vehicle requires DC power for charging, the electric power provided from the charging station 706 responsive to the utility power 704 comes from a DC power output mechanism at the appropriate voltage from the connector plug 708. The plug connection 708 provides the DC charging voltage directly to the battery 710.

In addition to the directly coupled electric vehicle charging configurations of FIGS. 6 and 7, an inductive or capacitive charging system may be used wherein the utility power 804 provided to the charging station 806 is inductively or capacitively coupled to a vehicle through an inductive or capacitive source 808 and vehicle receptor 810. An AC to DC conversion unit 812 within the vehicle converts the AC power into a DC component for charging the battery 814. Note that all three charging situations of FIGS. 6-8 utilize a charging station including an electricity control and management system 516 that provides the necessary electrical power conversion and regulation as necessary, turns on/off the charging power, measures the amount of electricity dispensed and performs other control functions such as monitoring the charge data showed the vehicle via data gathered from the vehicle during charging. Such data may be gathered wirelessly or via a connecting cable that connects the electric vehicle to the charging unit.

Figure 9:
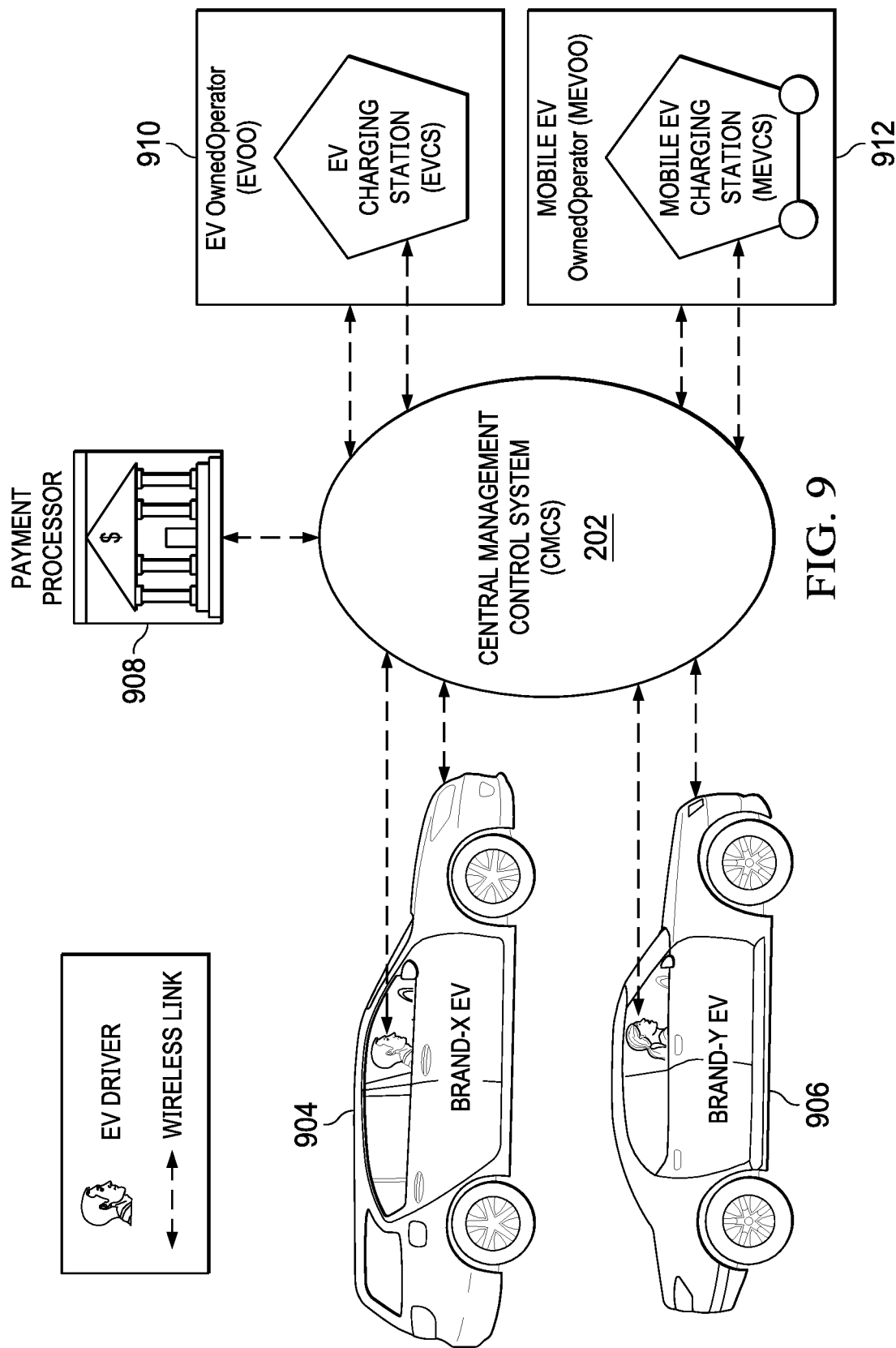
FIG. 9 illustrates a central management control system and its interaction with electric vehicle charging management system components.

FIG. 9 illustrates the main components of the charging system wherein the various components are wirelessly communicating with the charging control server 202. The charging control server 202 is the brains of the system and maintains a database of components including the profiles of the drivers and the charging units along with the locations of the charging units. The charging control server 202 monitors each transaction from start to finish, records the time of charging, performs payment processing and continuously collects information from the network components. The charging control server 202 wirelessly connects to different brands of electric vehicles 904, 906 through the mobile application and with the payment processor 908 to carry out payment for charging services. Further wireless connections may be between the owners and operators of various electric charging stations 910 at fixed locations or mobile electric charging stations 912 that may actually come to stranded vehicles to provide charging or to dynamically schedule and coordinate rendezvous between travelling electric vehicles and mobile charging stations. The mobile chargers 912 utilize onboard storage devices or generators enabling the mobile system to provide charging services wherever it is needed such as an electric vehicle rally, county fair, golf course or tournament where electric carts need charging, etc., or wherever electricity might be needed. By coupling onboard energy collection sources such as solar panels or wind turbines, a mobile charger 912 could operate indefinitely away from a power grid. These mobile chargers 912 provide a roving charging station on a moving platform such as a truck equipped with fossil fuel motorized electric generators or a bank of batteries that are either charged from the normal grid outlet such as 110 V AC wall circuit and/or are continuously charged on the road via onboard solar panels or energy collection mechanism such as wind turbines or the vehicles 12 V DC output.

The electric vehicle network management and charging system 202 provides the ability to match brand specific electric vehicles with brand compatible charging units and schedule an electric vehicle charging session. The system 202 also provides the means of matching and enabling non-electric vehicle owners who buy third party charging units to become independent operators operating on their own schedule to provide charging services. The system 202 will deliver the same transaction experience to those using brand specific electric vehicles and charging units by scheduling the transaction, measuring/metering and dispensing the electricity consumed, collecting and disbursing payment for consumption, recording the incident and tracking the process. The system 202 will provide for electronic record-keeping and payment processing. Payment mechanisms are universally available from third parties including the use of on-site magnetic card readers, smart chip card readers and even online Internet data entry through third-party portals for payment processing. Prepayment options are also available by pre-registering the electric vehicles payment options which then merely require the completion of agreed-upon payment protocols.

In another embodiment, the system may utilize modules of removable batteries wherein electric vehicle may simply exchange charge depleted batteries for a set of fully charged batteries, and thus eliminate the waiting time associated with charging the electric vehicles onboard batteries. When such electric vehicles are available as well as the battery modules, the system will utilize a battery exchange system to exchange batteries using the mobile applications and central controller described hereinabove with such modular batteries that are matched with their modular electric vehicle that may accept the batteries.

Figure 10:
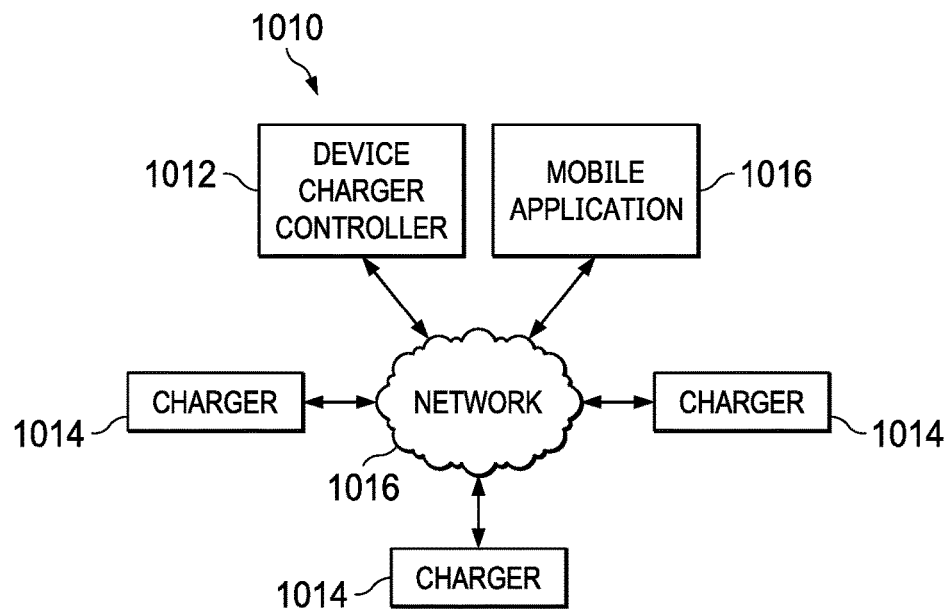
FIG. 10 illustrates a medical/mobility device charging management system.

Referring now to FIG. 10, there is illustrated an alternative embodiment of a system 1010 for managing a network of charging stations for personal electric devices such as personal mobility devices, personal medical devices, and personal media devices such as mobile phones, electronic tables and laptop computers. The system 1010 includes a central device charger controller 1012 that controls all charging operations between a plurality of charging units 1014 through a network 1016, such as the Internet. Individual users may establish appointments with the various charging units 1014 using a mobile application 1016 stored on their personal mobile devices. The mobile application 106 communicates with the central device charger controller 1012 and charging units 1014 through the network 1016. The system 1010 enables and facilitates the charging of electric devices at locations which provide charging facilities that can be reserved for use at predetermined times or opportunistically as availability permits. The charging units 1014 are provided at locations in or around where a user intends to engage in some activity such as those offered at recreational or food and beverage sites among other establishments, or in general where the user intends or expects to be spending an extended length of time to provide an effective charging cycle. However, the system 1010 is not restricted to such locations as such charging units 1014 may be rented out by the owner or operator for use at the user's option and pleasure. More simplified versions of charging units 1014 may simply be a battery for use in the user's device, or even for a battery exchange system as described herein above.

The network of charging stations 1014 are located within or near the property of a service provider such as a restaurant, cinema, concert hall, etc., or are transportable and can be reserved by a personal mobility device user prior to the user's visit at a particular vendor location. The user makes reservations for use of a charging unit 1014 via the mobile application 1016 which enables the user to connect to the central device charger controller 1012. The charging unit 1014 contains electronics and switches that control the dispensation of an electric charging current to the subscribing user's personal electric/electronic device under control of a central control module having functions that are incorporated within the device charge controller unit 1012. Each charging unit 1014 may contain several connectors that can be controlled from a single centralized controller. Each connector may have different connector configurations for connecting with different devices having different charging protocols.

The mobile application 1016 provides position information using various applications such as GPSS applications, cell tower triangulation techniques or using location sensitive beaconing technologies such as Apple Computer's Bluetooth app iBeacon. Typically, the application 1016 is downloaded to a mobile communications device such as a smart phone or electronic tablet. The application 1016 and central device charger controller 1012 enable the system to employ Internet of Things (IOT) protocols and methods to enable and provide for a range of services to the user who subscribes for such services via online registration through the application.

The system 1010 uses the network 1016 to provide shared computer and communication resources and to maintain databases within the device charger controller 1012, as will be described more fully herein below, for all subscribing vendors and system subscribers. Before registering a vendor, the vendor's venue must be audited as to the feasibility of providing charging unit services. The vendor must have Internet connectivity to become part of the system and may opt for other wireless communications methods such as Wi-Fi, and/or Apple computers app iBeacon that facilitates sending digital beacon messages from the vendor to the user. The vendor must also set aside or install specific electrical outlets and space to accommodate the secure and convenient charging of one or more personal electric/electronic devices at their premises or venue. The vendor would initiate the registration process using a mobile application 1016 in a similar manner that a new user would register with the system.

The installation of a beacon-like application on the user's smart device enables the system to provide the user with enhanced services. The electricity provided through the designated outlets is accessed, controlled and regulated via a device and/or software either within the vendor's premises equipment or in an external apparatus that connects with the system. The vendor, such as a restaurant operator that caters to electric wheelchair users, would designate specific wheelchair accessible tables which either incorporate one or more charging ports or in some cases the vendor might deploy their charging units at convenient personal mobility device parking areas provided the vendor also has a means for enabling the visiting user to be transported to the activity venue. All such information is part of the specific event venue profile and may be displayed on the user's mobile application 1012.

In the case of a personal mobility or medical device the charging unit 1014 employs Internet of things (IOT) technology to communicate with the central device charger management controller 1012. The charging unit 1014 also communicates with the personal mobility device in such cases wherein the personal mobility or medical device has built-in communications capability such as Bluetooth or Wi-Fi. In such cases, there may be a need to cooperate with the specific personal mobility or medical device manufacturer in order to obtain the personal devices API (application program interface). Access to such APIs may be required to enable the system's sophisticated features such as trip planning so that the system can determine and correlate the real time charge state of the personal devices' battery and trip characteristics such as the average speed of travel among other measurement parameters for a personal mobility device or the rate of battery drain and medication consumption as in the case of a personal portable medical device user.

The system 1010 incorporates other positioning technologies for such purposes including beaconing technologies and wheel mounted odometers to enable the determination of distances traveled by the personal mobility device based on revolutions of the wheel. Other means of providing such information may utilize third-party apps such as Google maps whereby the system can derive the personal mobility devices position and travel progress via the user's smart phone GPSS system. IOT capability may be deployed in several elements of the vendor's equipment portfolio. Other methods and apparatuses may be used to garner the necessary personal mobility device travel and battery state data to determine the distance traveled and other apparatuses they can be interfaced with the PMD battery for real-time battery state and charge logging. Additionally, the central management controller would measure the quantity of electricity consumed by the personal mobility device during the charging session.

Figure 11:
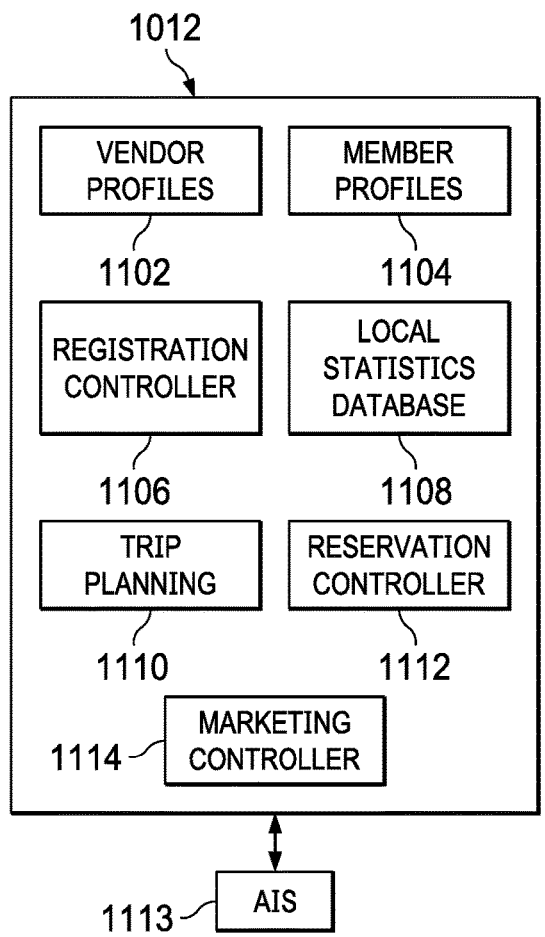
FIG. 11 is a block diagram of a central management server of a medical/mobility device charging management system.

Referring now to FIG. 11, there is illustrated a functional block diagram of the central device charger controller 1012. The controller 1012 includes databases of vendor profiles 1102 and member profiles 1104. The vendor profiles 1102 store information concerning charging units 1014, and the individuals controlling operation of the charging units. The member profiles 1104 include information about users who have registered their personal mobility devices, personal medical devices or other electric devices for charging through the device charger controller 1012 and charging units 1014.

The local statistics database 1108 stores information relating to the neighborhood surrounding charging units 1014. This information may comprise information such as the availability of handicap parking near the particular vendor providing the charging unit or locations of personal mobility device accessible washrooms and other amenities such as restaurants and shops located nearby. Locations of nearby medical facilities that can provide treatment and services specific to the needs of a specific personal mobility device or personal medical device users will also be displayable through the mobile application 1016 in the event that the user is in need of medical intervention. Because of the user's dependence on the personal mobility device, the system could also provide the locations of nearby personal mobility device shops for parts and service and their hours of operation.

Registration controller 1106 is responsible for enabling new users to register with the central device charger controller 1012 after they have downloaded the mobile application 1016 to their personal mobile device. Trip planning controller 1110 enables a user to interact with the central device charger controller 1012 through their mobile application 1016 to plan a trip between locations and locate charging units 1014 located in close proximity to the trip route. Once various charging units 1014 are located that correspond to the trip plan, the reservation controller 1112 enables the user to make a reservation for a particular charging unit 1014 at a particular time through the mobile application 1016. An AIS 1113 may be utilized to provide more sophisticated trip planning that incorporates biometric measurement and monitoring to facilitate intervention for medical or other reasons. Marketing controller 1114 generates programs for marketing particular services to users by pushing information from the charger controller 1012 to the mobile applications 1016.

Figure 12:
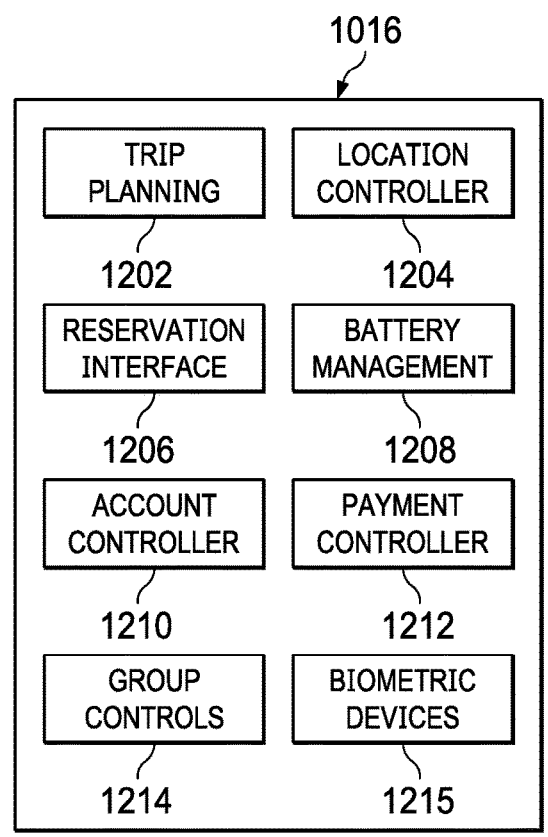
FIG. 12 is a block diagram of a user application of a medical/mobility device charging management system.

FIG. 12 illustrates a functional block diagram of the mobile application 1016 stored upon a personal mobile device. The application 1016 includes trip planning functionalities 1202 enabling a user to plan and locate charging units 1014 in conjunction with the device charger controller trip planning functionalities 1110. The trip planning functionality 1202 enables a user to search for charging unit enabled establishments/locations to make bookings and reservations for use of a specific charging unit 2014. The trip planning functionality 1202 utilizes charging unit 1014 availability around the specified area and may be carried out manually by user selections or automatically/semi-automatically with assistance from the trip planning controller 1110 within the device charger controller 1012 and in conjunction with AIS 1113. Utilizing user inputs of estimated times to be spent at each portion of a trip, the trip planning functionality 1202 in conjunction with the trip planning controller 1110 of the device charger controller 1012 provides advice on a sequence of charging stops and the optimum time and duration to be connected to a charging unit 1014. Upon user confirmation of a trip plan, the system will make the necessary reservations utilizing communications between the reservation interface 1206 of the application 1016 and the reservation controller 1112 of the device charger controller 1012 at the appropriate charging unit 1014. AIS 1113 may be employed to make trip adjustments dynamically in reaction to trip actualities.

The location controller 1204 enables the mobile application 1016 to determine a current position of the mobile device housing the mobile application. The location controller 1204 makes use of global positioning or other positioning functionalities to determine a terrestrial location of the personal mobility device, personal medical device or other electric device for charging. This is useful in locating charging units 1014 that are in a current proximity to the user. The reservation interface 1206 enables the mobile application 1016 to generate a reservation for a particular charging unit at a particular time. The reservation interface 1206 interacts with the registration controller 1106 of the device charger controller 1012 in order to locate available charging units 1014. AIS 1113 may be engaged to direct 1206 to make the necessary reservation changes.

Battery management controller 1208 makes calculations and determinations with respect to a user current battery charge for a personal mobility device or personal charger device. The battery management controller 1208 determines when a last charge of the device occurred and based upon known discharge characteristics generates alerts and provides notifications to users when recharging of their personal mobility device or personal medical device is necessary in order to avoid the devices becoming completely discharge and stranding the user or placing them in a medical emergency situation. The battery management controller 1208 controls battery management and provides proper charging sequences, conditioning and protections. The battery management controller 1208 assesses battery to charger compatibility, provides charging management and provides real-time feedback and reporting on the charging process and level of the charging device's battery charge so as to alert the user when the battery reaches specified user established threshold triggers or if the battery is impaired. This management and control by the battery management controller 1208 also ensures that the charging process is consistent with the various battery chemistry and technologies used in the respective batteries. Such control may also be moderated on demand to affect the charging rate for the battery such as to enable vendor discretion for pricing their services on the basis of fast or normal charging rates. The battery management controller 1208 may also provide automatic cutoff of the charging process when anomalies are encountered to prevent hazardous events.

The account controller 1210 stores user account information enabling a user to login to the device charger controller 1012 in order to obtain charging services. The account controller 1210 provides real-time account access by vendors and users as to their individual accounts to obtain charger usage and financial information and management. For example, the current status for a charging unit reservation and utilization may be obtained by the vendor. Users may obtain reservation status and carry out actions such as charging to a credit card and/or debiting a bank account with a predetermined booking fee in order to credit the amount to the system and reserve a predetermined portion of the transaction fee for the serving vendor. Payment controller 1212 stores payment information for the user enabling them to utilize the mobile application 1016 to automatically pay for and obtain charging services using for example credit card information, PayPal information, automatic bank draft information or other payment protocols such as Apple Pay, etc.

The group control functionality 1214 provides for social media interactions and group socializing of system users. Group socializing such as the coordination of user activated group activities and/or assembly when the invited individuals are allocated to specific charging units 1014 for charging. Things such as group gifting capabilities may be facilitated to enable users to coordinate a group gifting campaign for a user, or anyone else that has an email address and or mobile phone number. The group control functions 1214 also provide the ability to offer other group apps by third parties such as SPOND or Evite to enable group gatherings to be offered through the system 1010. Group controls 1214 could also provide neighborhood watch capabilities whereupon a user can automate the setting of alarm that is broadcast to one or more individuals whenever a trip plan is violated as to time of expected arrival and expected trip stop location as might occur when an elderly personal mobility device user gets forgetful and strays from their planned activities. Biometric measurement devices 1215 may also be used to provide indications for the need of medical or health related interventions. In such situations, the system could be programmed to send out a distress signal to either the police, and/or other preset emergency contacts. Distress signaling could be provided to alert care practitioners and/or emergency responders when a user's biometric condition triggers preset thresholds. The biometric devices 1215 may also me used for validating a user and enabling initiation of the charging process. The biometric devices 1215 may comprises devices such as fingerprint scanners, voice recognition devices, retinal scanners, etc. The group controls 1214 also provide aggregation or grouping of various personal mobility devices accessible establishments and provide advertising services to such establishments to coincide with trip plans that a user may establish using the trip planning functionalities 1202.

Figure 13:
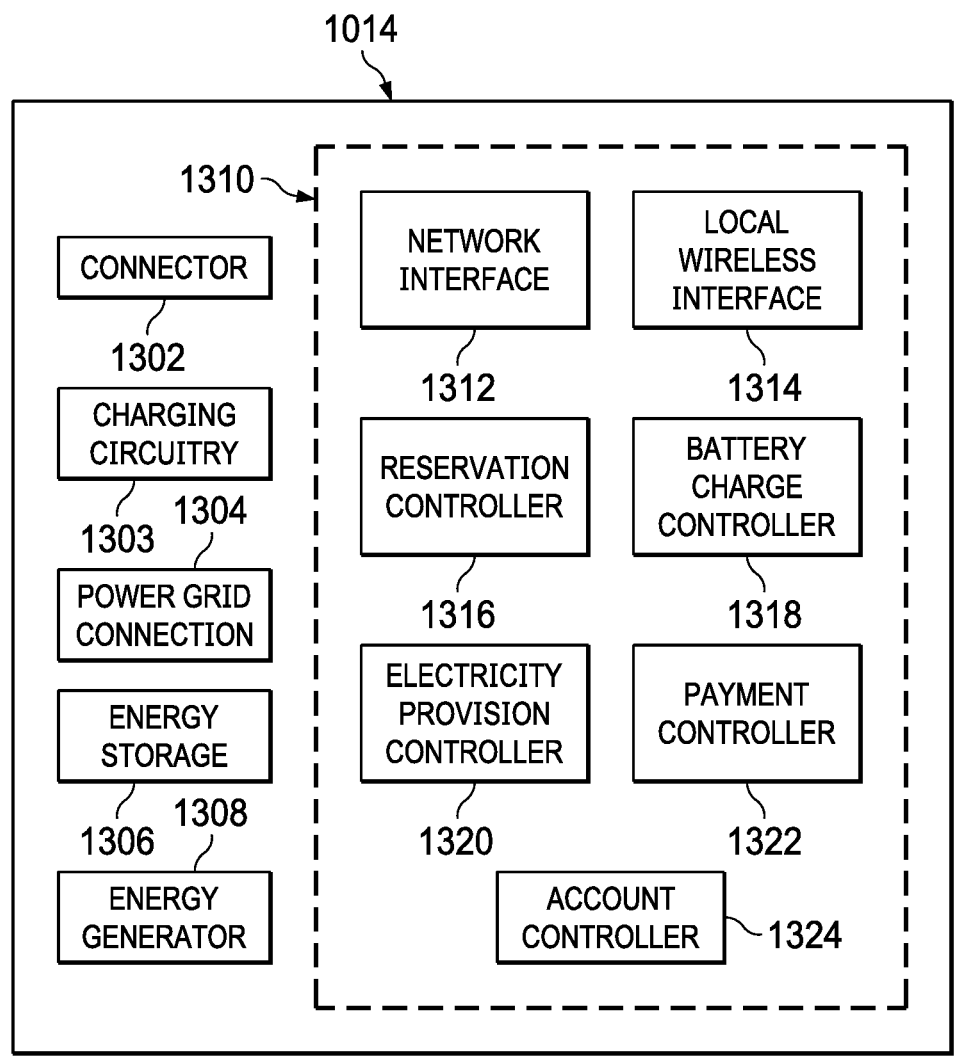
FIG. 13 is a block diagram of a charging unit of a medical/mobility device charging management system.

FIG. 13 provides a functional block diagram of the charging unit 1014. A connector 1302 enables the charging unit 1014 to connect with a device that is being charged. The connector 1302 provides charging current from the charging circuitry 1303. The charging circuitry 1303 generates the charging current from a provided energy source. The connector 1302 can be of one or a plurality of types to enable the charging unit 1014 to connect to a variety of different personal mobility devices, personal medical devices or other types of electrical devices needing charging. A connector 1302 may provide direct, inductive, capacitive coupling or other state-of-the-art over the air technologies to the charging unit from the device being charge. The connector 1302 may comprise several connections under control of the central control module 1310. Each of the plurality of connectors may employ different connector configurations for connecting personal mobility devices as different personal mobility devices may employ different connecting plugs and also contain different types of batteries (such as sealed lead acid (SLA) or lithium ion battery chemistry), different battery capabilities and different battery charging voltages and charging protocols.

The central control module 1310 provides a range of battery charging management and control protocols and functionalities for regulating the charging process as well as to monitor the personal mobility devices battery charge state to prevent overcharging which can lead to fire and explosions. Power grid connection 1304 connects the charging unit 1014 to the electrical power grid. The power grid connection 1304 provides a connection to the power grid that enables the charging unit to charge a connected electrical device using a generated charging current.

In addition to receiving electrical charging energy from the power grid, energy generator interface 1308 enables connection to an alternative energy generation source such as solar cells, a wind turbine, a gas powered generator, etc. Energy storage batteries 1306 may be used for storing energy for charging a connected electrical device without requiring an active electrical power connection. The off grid power provided by batteries and/or other energy storage devices can be regularly charged by solar panels or other renewable energy power generators such as wind turbines or even fossil fuel power generators. Offered power may in fact also be provided by user devices whereby one personal mobility device may be used to transfer power to another personal mobility device whether singly or in a ganged or combined fashion. The concept is not restricted to personal mobility devices but may also be applied to all portable or transportable user devices for inter-device charging. The batteries may be charged from a connected alternative energy source through the energy generator interface 1308 or through the power grid connection 1304.

A central management controller 1310 includes all of the central control functionalities for controlling the operation of the charging unit 1014 responsive to control information from the central device charger controller 1012 and mobile applications 1016. Communications with the central device charger controller 1012 and mobile applications 1016 are carried out through a network interface 1312 enabling communications over the network 1016. Further communications to the network 1016 or local devices may also be carried out through a local wireless interface 1314 using Wi-Fi, Bluetooth or other wireless communications protocols or through the powerline itself. The reservation controller 1316 enables information to be exchanged regarding the establishment of a reservation by a user, validation of the user upon arrival at the charger 1014 for charging, and notification of the reserved status of charging unit 1014 at a particular point in time at which a reservation has been granted. The battery charging controller 1318 controls the battery charging process when an electrical device is actually connected with the charging unit 1014.

Upon validation by reservation controller 1316 of the valid connected device and user member that made the reservation the electricity provision controller 1320 works in conjunction with the charging circuitry 1303 to regulate the flow of electricity to the device's battery. The electricity provision controller 1320 has the ability to regulate the flow of electricity in such a manner as to manage the charging of the users device battery that are connected to the charging unit 1014 so as to optimize the charging process or simply to regulate the speed of charging based on pricing and payment protocols. This process is facilitated by the incorporated data communications capability of the local wireless interface 1314 using Wi-Fi, 3G, 4G, Bluetooth etc. Payment controller 1322 provides point-of-sale functionalities enabling a user to pay for charging services received by their electric device. The payment controller 1322 may be in the form of a magnetic strip or smart chip reader that reads information from a credit card or a data entry terminal that receives information from a user's mobile application or enable manual entry relating to payment information that is used to charge a user's account. The account controller 1324 provides access to user account information based upon information received from the mobile application 1012 that has requested a charging time or is providing payment information.

In the case of the charging of large capacity battery powered personal mobility devices such as electric wheelchairs and scooters for the mobility impaired, such personal mobility devices typically take a long period of time to charge but are quick to discharge in use due to the unpredictable energy consumption modes. In such cases where the charging time required is long and there is a physical or medical dependence on the device by the user, the utility of being able to reserve a charging port becomes more of a necessity rather than a convenience. Consider the case of an electric wheelchair user, or the user of a portable oxygen concentrator (POC), a respiratory device for chronic obstructive pulmonary disease sufferers which requires the need of a charge while the user is out of their home. The user dependence on his wheelchair or POC precludes leaving the device to be charged while the user engages in an activity; unless the user has a spare device to use while their other device is charging or the user is participating in an activity at the charging station itself such as a eating dinner at a restaurant or watching a show at a theater.

Using the mobile application 1016 and device charger controller 1012, the user is able to reserve a charging port in advance for a predetermined time where the user knows they will be present at or near a specific charging facility. The user may also charge their device at the establishment when they are engaged in an activity at a location, such as dining at a restaurant, for a particular period of time. One of the features of the system is the assisting of the user in determining the optimum time for recharging which coincides with a period of immobility such as eating dinner in the restaurant that includes a charging unit and/or has the ability to facilitate charging services. The described system has tremendously broad utility and applicability to any and all rechargeable devices. While the disclosure is made with respect to rechargeable electric motor powered personal mobility devices for mobility impaired individuals or personal medical devices, the concept described herein is applicable to other types of electrically rechargeable devices that store energy and require recharging or energy refurbishment. The concept described herein is also applicable to other modalities of energy storage and dispensation such as hydrogen gas or other compressed fluids.

Figure 14:
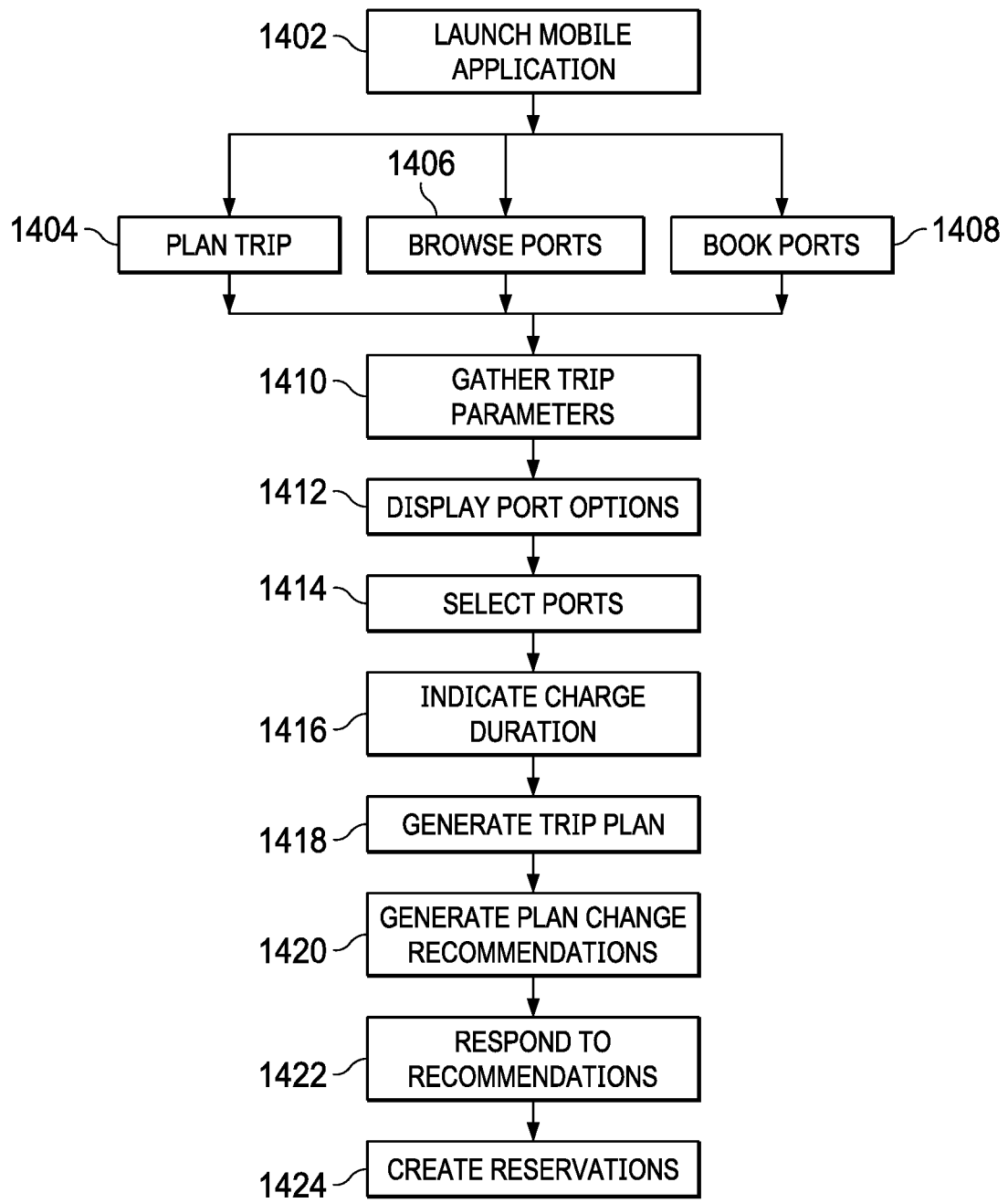
FIG. 14 is a flow diagram illustrating the process for generating a reservation in the medical/mobility device charging management system.

Referring now to FIG. 14, there is illustrated a flow diagram of the process for generating a reservation transaction. The system concept may be applied to a ride variety of rechargeable devices, and the utilization of the features of the system are very diverse. In the example of a personal mobility device user, one such feature of the system which is accessible via the mobile application 1016 is to plan a trip that encompasses various trip stops for charging the personal mobility device during the course of the journey and to coincide those charging periods with a specific stationary activity such as dining, drinking, reading or viewing a movie. During these times a personal mobility device is connected to a charging port and is being charged during the user's activity. A user launches at step 1402 the mobile applications 1016 on a smart phone or other communications devices such as electronic tablets and reviews several action options available for execution such as plan trip 1404, browse charging units 1406 or book charging units 1408. The user selects, in one example, browse charging units at step 1406 and asks for destination and area coverage at step 1410 to gather various trip parameters enabling them to make a charger selection. The coverage area may be viewed in miles, yards or even metric dimensions. The user application 1016 displays at step 1412 the various locations that include charging units. The user browses the available destination points that they intend to visit during their trip to make sure that charging units 1014 are available during their trip.

Once satisfied with the availability of charging units 1014 at the specified trip stops, particular charging units 1014 are selected at step 1414 for the trip. The application 1016 asks for the expected duration spent at each charging unit at step 1416 and upon user confirmation, a trip plan is generated at step 1418 that lists the recommended sequence of trip stops and the times allocated at each stop. The user can also generate trip plan change request/recommendations at step 1420 to charging units 1014 that have not been made a part of the generated trip plan. Based upon considerations of the stop length times and expected lapse times and battery drain, the system will specify the trip plan at 1418 and provide recommended times for a charging appointment. The user can confirm the recommendation at step 1422, or alternatively, generate plan change recommendations at step 1420. If a user's changes are inconsistent with the user's personal mobility device characteristics and planned usage of the trip, the system will prompt the user for alternative selections and/or propose alternative charging unit bookings. Upon acceptance of the recommendations at step 1420, the reservations may be generated at step 1424.

Upon confirmation of a trip plan, the system will make the necessary charging unit 1014 reservations at step 1424 and interface with the appropriate charging units to perform the necessary booking protocols such that the charging unit 1014 is reserved for a particular user. At all times the power output of charging unit 1014 is turned off and not available to unauthorized users and/or devices until appropriately validated. Alternatively, using the trip planning functionalities 1202 of the application 1016, the user can simply plan a trip by selecting planned trip on the opening screen of his smart phone and the system in conjunction with AIS 1113 will check the availability of charging units 1014 at various destination points and generate a trip plan with trip stop sequences automatically.

Figure 15:
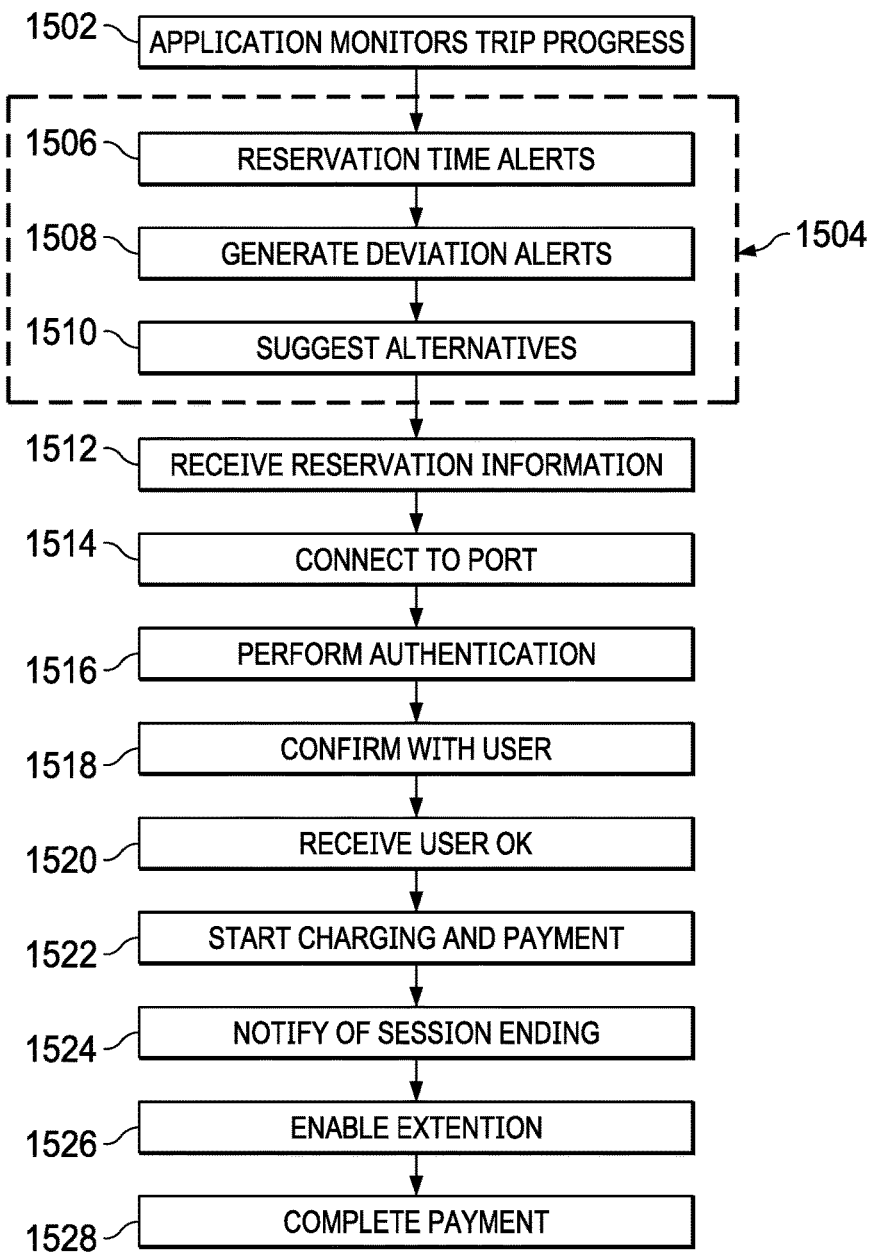
FIG. 15 illustrates an individual user using the medical/mobility device charging management system during a particular trip.

Referring now to FIG. 15, there is illustrated the process of using various reservations for device recharging during an actual trip. The user begins their journey and the mobile application 1016 will monitor the trip progress at step 1502. Based upon the trip progress monitoring, a number of different alerts or suggestions as shown generally at step 1504 may be generated to the user through their mobile application 1016. The user may be prompted along the way with reservation time alerts 1506 as scheduled charging unit 1014 reservation times approach. Alternatively, if the monitoring determines that the user has deviated from their trip plan schedule and appears to endanger their battery consumption plan, the system will generate a deviation alert at 1508 and prompt for a corrective action or propose a change in the trip sequence at step 1510 so as to enable an alternative charging units 1014 booking. However, such changes may result in booking cancellation penalties which are charged directly to the users credit card or bank account on file within the system. The user may also engage the AIS to entirely manage the charging sequences based on tracking the user's journey.

When a user stops at an appointed time at an appointed charging unit location, the user will present their reservation information at step 1512 to the charging unit and is directed to a charging unit 1014 where the user can connect their personal mobility device, personal medical device or other rechargeable electric/electronic devices. Alternatively the charging unit 1014 may also provide indication of its location by optical means such as flashing colored lights which also indicates the charger's state of operation. The charging unit 1014 may also broadcast its location using beacon technologies that the mobile application 1016 may home in to or lock onto to provide direction guidance. Assuming that the vendor is a restaurant, the charging unit 1014 will likely comprise a reserved table. The personal mobility devices or electric wheelchair can simply wheel up to the table and charge while they are dining. Alternatively, if the personal mobility devices and electric scooter cannot be used at a dining table, the vendor will likely have a designated parking area that is charging unit 1014 equipped, and the user is provided with a temporary wheelchair which can be used at the table. All such information concerning the vendor charging environment is available to the user through their mobile application 1016.

The user connects their device to the charging unit at step 1514. As soon as the device is plugged into the charging unit 1014, an authentication sequence will be initiated at step 1516. The progress of the authentication sequence is displayed on the users mobile application 1016 and may comprise verifying the personal mobility device identification (e.g. registered serial number), verifying the make model and power specification of the personal mobility device (which requires a user's affirmative action to ensure that the personal mobility device has not been modified from its original manufacturing state), the user's credit card, bank account or other payment source is validated, and the time of the connection is recorded. Alternatively, if the user had purchased usage credits in advance then such credits may be utilized as payment. The user authorizes commencement of the charging at step 1518 and this confirmation is received by the charging unit 1014 at step 1520. The system provides for different categories of users and does not require that the user have a smart phone and mobile application 1012. Each vendor having a charging unit is equipped or enabled to act as a proxy for authorization whereupon the visiting user may perform the authorization via the vendor's point-of-sale device. Such an option is a necessity in the case of a disabled user that cannot operate a smart phone, or tablet or does not have either one. Alternatively the system may use biometric validation methodologies.

The charging process is initiated and payment made at step 1522. Once the scheduled charging unit session is nearing termination, the user and vendor are alerted at step 1524. The user may be given an opportunity to extend the charging session at step 1526 provided that no other bookings for the charging unit 1014 have been scheduled. In the event that the specific charging unit 1014 has been pre-scheduled by another user, the system may offer the current user a different charging unit that is available on premise. The system or vendor also has the ability to re-assign a different charging unit 1014 to the next scheduled user whereby the current user of a charging unit may extend his charging time or use of the vendor's facilities for perhaps an additional fee. Once the session is terminated, the system will complete the payment protocols at step 1528, and the user's preselected form of payment is charged and credited to the serving vendor's account. The system provides a variety of financial payment operations as commonly practiced in e-commerce such as scheduled billing and payment, recordkeeping and periodic statement reporting, etc. It is up to the system operator and vendor to determine the frequency and method of payment from the system operator to the vendor.

Figure 16:
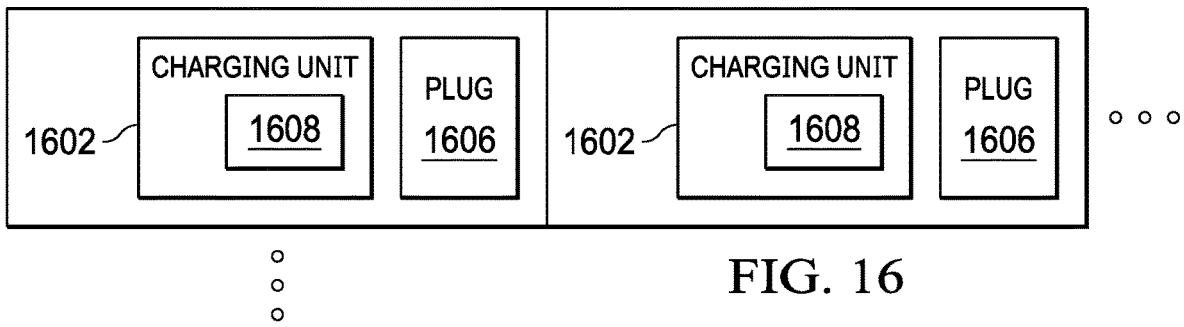
FIG. 16 illustrates a further configuration of the charging units included within a group of one or more lockers.

Referring now to FIG. 16, there is illustrated a further configuration of the charging units, wherein a plurality of charging units 1602 are included within a group of one or more lockers 1604. Each locker 1604 includes at least one charging unit 1602 such as that discussed herein above and a plug 1606 for connecting any type of electric device that needs charging. Users can access the locker by several means, by using a digital or biometric key or by paying an indicated fee. In the case of a digital key the user enters a code received through a mobile application or by paying an indicated fee through the application. Alternatively, the user may gain access by biometric verification of his identity compared with a pre-stored biometric file in the system. Upon validation of the user's identity the user is then able to have access to the charging unit 1602 and plug 1606. The user can then connect their device for charging and lock the device in the locker while it is charging to maintain the device in a secure location while the user perform other activities. The communications interface 1608 associated with the charging unit 1602 can contact the user through the user's mobile application to broadcast a charging state (charging, quarter charge, half charge, three-quarter charge, complete charge, etc.) of the electric device being charged. The lockers 1604 could additionally be used in a kiosk or other convenient grouping of the charging units.

The preceding discussion depicts one example of a charging management and reservation system wherein a personal mobility device, personal medical device or other electric device is charged with a device specific cable that presumably delivers the appropriate DC voltage and amperage to the device while the charging unit 1014 performs the charge monitoring and management. Different devices may have different battery charging protocols, different connectors and characteristics and may either have an onboard charger which can be directly connected to the 120 V AC outlet or require an offboard (not part of the device) charger that provides the appropriate DC charge voltage and amperage and connectors. All these characteristics of specific devices are matched to the specific vendor's equipment repertoire.

The architecture of the management and reservation system 1010 is designed to be an "open" system which enables the incorporation of third-party apps and system components such as third-party cloud platforms, group meeting and group gifting apps. Additionally, the system functionality is an open system that can provide the same reservation and charging functionality for other rechargeable devices such as Ebikes, two wheeled balance scooters or Segway devices, smart phones and tablets and portable respiratory devices dependent on the particular vendor. A vendor could simply be an individual that owns a charger for a specific rechargeable device that may be obsolete or hard to come by and in such situations the individual vendor may find an opportunity to rent out their charger rather than recovering a one-time sale. The user could also be traveling and have forgotten to carry their charging equipment for their device in which case the ability to rent such a charger via the system would be a lifesaver.

The system also incorporates the capability to register vendors on the spot via the mobile application 1016 as in the case when a user finds a willing establishment that is not yet part of the system but which is willing to allow the user to utilize the establishment's 120 V AC or alternative power outlet. In providing this vendor registration capability via the mobile application 1012, the system is able to propagate utility organically via its membership database.

Figure 17:
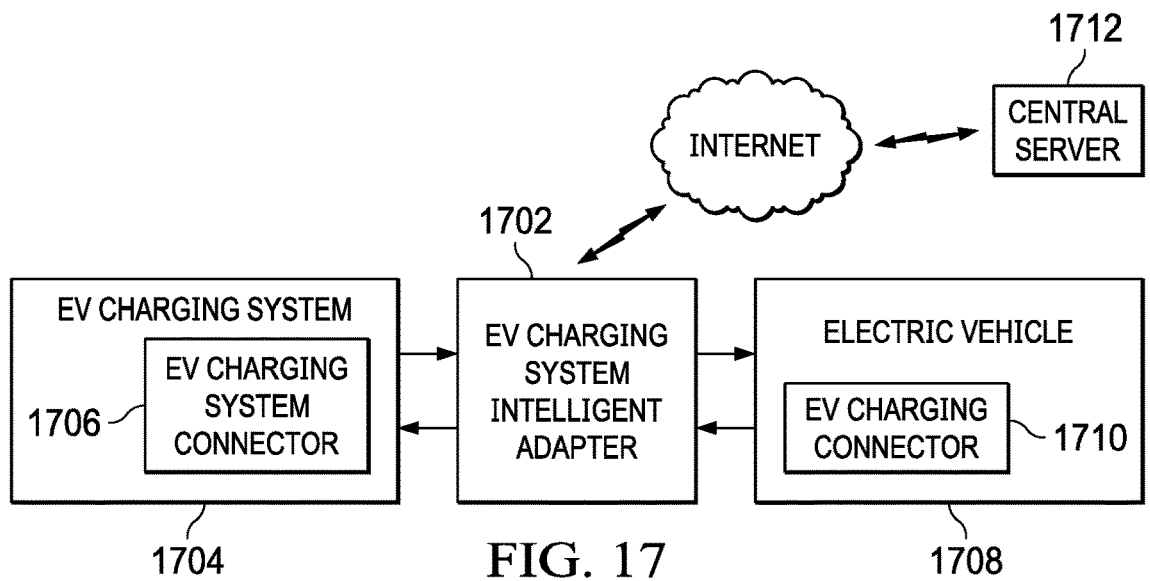
FIG. 17 illustrates a block diagram of an intelligent charging adapter for use with a dumb charging system.

Referring now to FIG. 17, there is illustrated a further embodiment wherein an electric vehicle charging system intelligent adapter 1702 may be used for converting a dumb electric vehicle charging system 1704 that provides no network interconnectivity into an intelligent charging system with remote communications connectivity and control. The electric vehicle charging system 1704 such as that described hereinabove includes an electric vehicle charging system connector 1706 that is used for interconnecting with an electric vehicle 1708. In its normal configuration, the electric vehicle charging system connector 1706 connects directly with the electric vehicle charging connector 1710 to initiate charging of the vehicle 1708. As electrical vehicles become more popular, the access to public charging station remains the number one barrier to widespread adoption of electric vehicle technologies. The high cost of installing and equipping electric vehicle charging stations (EV stations) with one or more EV chargers hinders the construction and deployment of EV charging stations. In addition, most EV charging stations are unmanned and thus the availability of the stations EV charging chargers is unknown until electric vehicle drivers arrive at a particular location to use the chargers. Thus when they arrive, the driver may find the equipment is in use or currently inoperative.

This limitation may be overcome as shown in FIG. 17 by use of an electric vehicle charging system intelligent adapter 1702. The adapter 1702 provides for remote communications connectivity and control to provide better control and information with respect to the EV charging system 1704. The EV charging system intelligent adapter 1702 converts the standalone EV charger 1704 at any unmanned EV station into an intelligent charger whereby the availability of such chargers may be monitored and reserved remotely and controlled for dispensing electricity using for example the systems described hereinabove. A single EV charging system intelligent adapter 1702 is required for each charger 1704 at the EV charging station. The adapter 1702 is designed to interface directly with the EV charging system connector 1706 such that the adapter 1702 merely plugs into the connector 1706 of the charging system 1704. The EV charging system intelligent adapter 1702 then plugs into the electric vehicle charging connector 1710 in the same manner that the EV charging system connector 1706 would. The adapter 1702 then provides remote communications connectivity and control as will be more fully described herein below. This makes the conversion process simple and inexpensive.

There are over 50,000 unmanned publicly accessible EV chargers within the US that are neither remotely controlled nor available for remote reservation. In addition there are hundreds of thousands more EV chargers that are installed in private homes by electric vehicle owners. By equipping such standalone EV chargers 1704 with an EV charging system intelligent adapter 1702, electric vehicle drivers may conveniently search for adapter equipped chargers that are available and even reserve the chargers without being inconvenienced by traveling to an unmanned EV station to only find out that the chargers are not available for use.

The EV charging system intelligent adapter 1702 encompasses various technologies such as the Internet, cloud computing, wireless communications, remote control techniques, in-line, near-field and transponder communications, power transmission protocols, delivery and measurement, database techniques and technologies, smart electricity grid techniques, alternate power conveyance grids, direct and wireless power conveyance/delivery/transference, location determination technologies such as GPS, and Internet Of Things ("IOT") protocols and methods to enable and empower EV chargers with intelligence for remote control and use.

The EV charging system intelligent adapter 1702 is an electrical and mechanical apparatus that is attachable to the charging connector 1706 of an EV charger 1704 that complies with the International Electro technical Commission (IEC) standards and other relevant standards governing EV conductive charging systems with general characteristics including charging modes and connection configurations, and requirements for specific implementations (including safety requirements) of both electrical vehicle 1708 and electric vehicle supply equipment (EVSE) in a charging system, such as the control of power supplied to the electrical vehicle 1708 and the signaling between the electrical vehicle 1708 and the EV charger 1704. Such standards may also cover devices such as plugs, socket-outlets, vehicle couplers and vehicle inlets. In one embodiment the EV charging system connector 1706 may comprise a SAE J1772 Level 1/2 connector as used in North America. However, the functionality and principles of the system extend to all other standard conforming connectors such as the VDE-AR-E-2623-2-2 which is used in Europe, the JEVS G105-1993 (commonly known as CHAdeMO) which is used in Japan and any other configuration for a charging connector.

Further, the use of the adapter 1702 is not constrained to Level 1, 2 or 3 chargers with their different voltages and current limits. Essentially, just as the J1772 connector is equipped with five pins of which two are the AC wires, one is the ground, and two are signal pins for proximity detection and for the control pilot function. Other connector types also have at least one pin that is used as a control communications link and one or more pins as power pins for DC or AC power.

Figure 18:
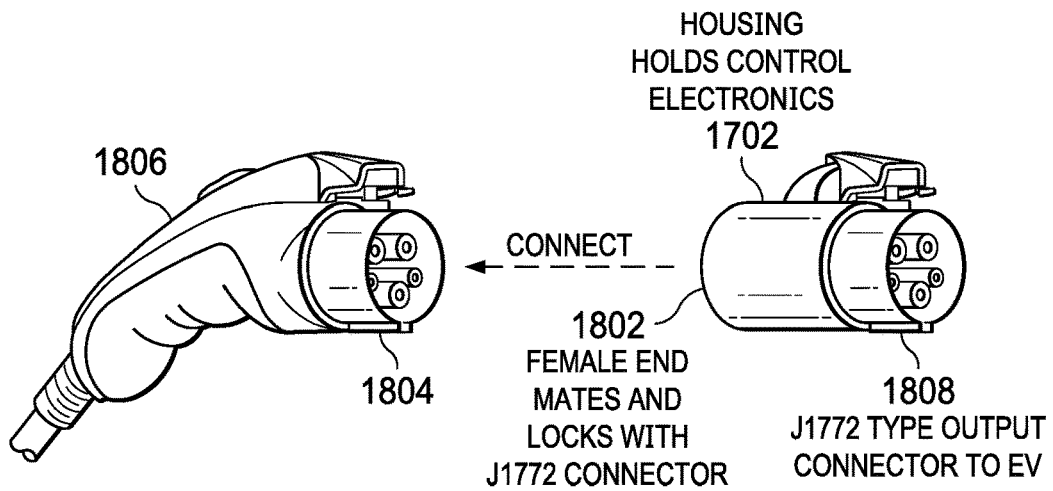
FIG. 18 illustrates a charging adapter that mates with a charge connector of a charging system.
Figure 19:
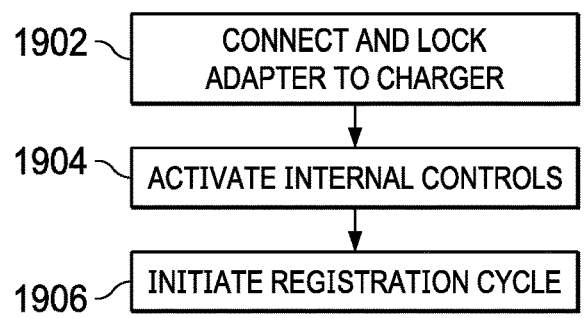
FIG. 19 illustrates a flow diagram of the process occurring when a charging adapter is connected with the charging system.

Referring to FIG. 18, the EV charging system intelligent adapter 1702 contains control electronics that manage the functions of the adapter. The adapters 1702 corresponding female inputs 1802 mate and lock with the male connector pins 1804 in the J1772 connector 1806 coming from the EV charger 1704. The adapter 1702 provides a new J11772 type connector 1808 to act as a connector with an electric vehicle connector 1710. Referring now also to FIG. 19 there is illustrated the process for connection of an adapter 1702 to an EV charging system connector 1706. Upon mating and locking of the adapter 1702 with the charger's J1772 connector 1806 at step 1902, the adapter's internal controls are activated at step 1904 and initiate a registration cycle at step 1906 whereby the adapter 1702 is wirelessly connected to a central server 1712 under management of the charger service administrator. The registration process essentially tells the central server 1712 that the EV charger 1704 to which the adapter 1702 is connected is now available for rent.

Figure 20:
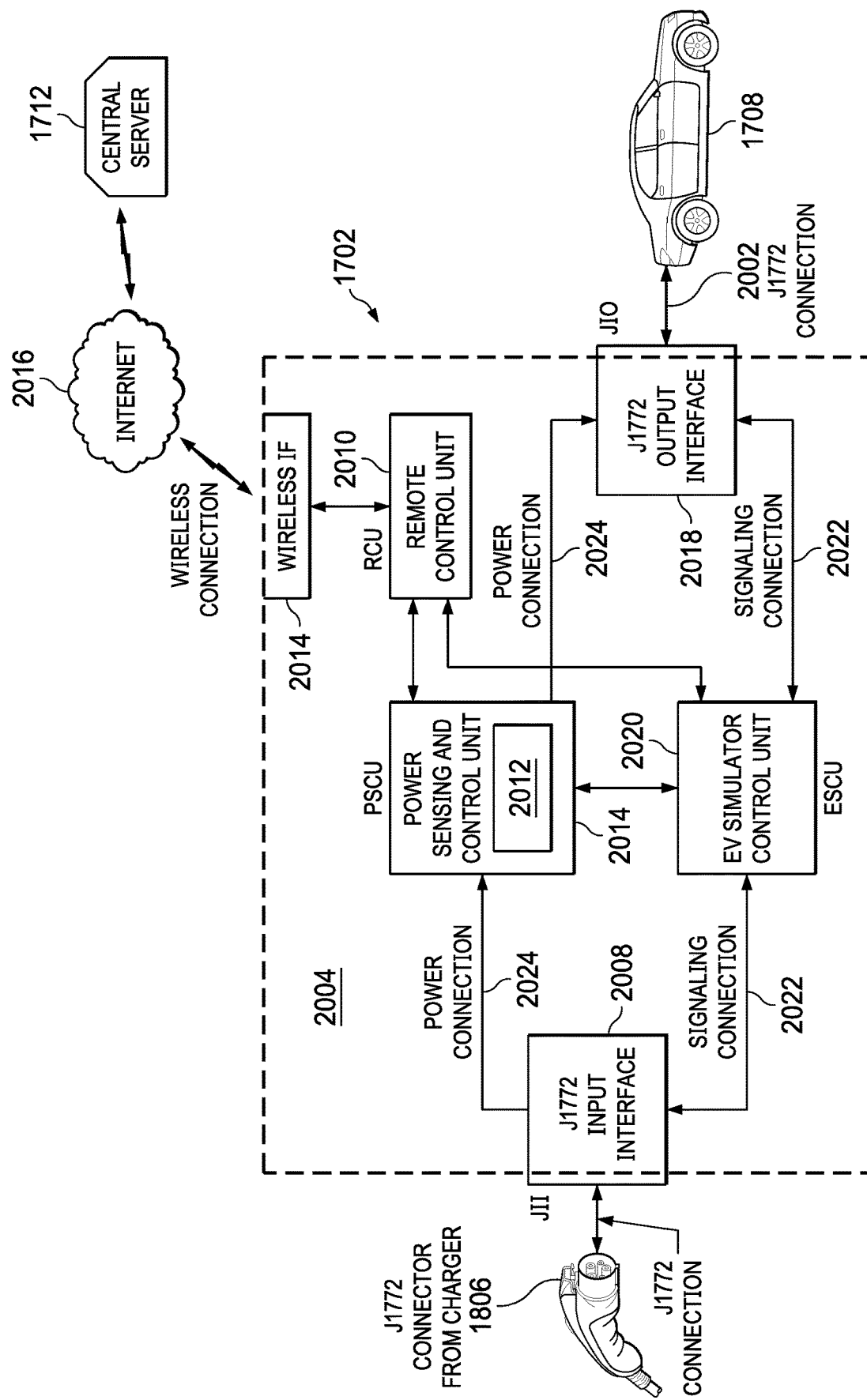
FIG. 20 illustrates a functional block diagram of the intelligent charging adapter.

Referring to FIG. 20 there is illustrated a functional block diagram of the adapter 1702 for interconnecting a J1772 connector 1806 with an electric vehicle 1708 via another J1772 connector 2002. The adapter components are located within an adapter housing 2004. The J1772 connector 1806 on the input side of the adapter 1702 is connected to a functioning EV charger 1704, which in turn is connected to an electrical power supply. The input interface 2006 provides a means for connecting the adapter 1702 with the EV charger connector 1806 and includes female inputs for interconnecting with the male input pins of the charger connector 1806. Once the adapter 1702 mates with the EV charger 1704 through its J1772 connector 1806 to the adapter's J1772 input interface 2006, the remote control unit (RCU) 2010 detects the connection to the charger and activates the adapter using power from an internal removable, rechargeable battery 2012 within the power sensing control unit (PSCU) 2014. The RCU 2010 then commences communications with the central server 1712 using a wireless interface 2014. The wireless interface 2014 provides for a connection to the central server 1712 using a cellular data network, Wi-Fi network or any other type of wireless communications protocol. The RCU 2010 controls operation of the adapter 1702, manages control of the adapter responsive to commands from the central server 1712 and controls charging signals passing through the adapter 1702.

The central server 1712 manages all the adapters 1702 in the field and also the mobile apps within user's mobile devices for reserving an adapter-equipped charger (an "i-Charger"). The RCU 2010 contains a communications module that set ups a communications link with a local Wi-Fi router or other wireless communications network to access the Internet cloud 2016 and thereon to connect with the central server 1712 using the wireless interface 2014. The connection with the cloud 2016 may be provided by several means including inline powerline communications or wireless router to a modem connected to an Internet provider, or by satellite data connection, or through a cellular data link. Thus, even a remote EV charger 1704 can be communicated with by the central server 1712.

Figure 21:
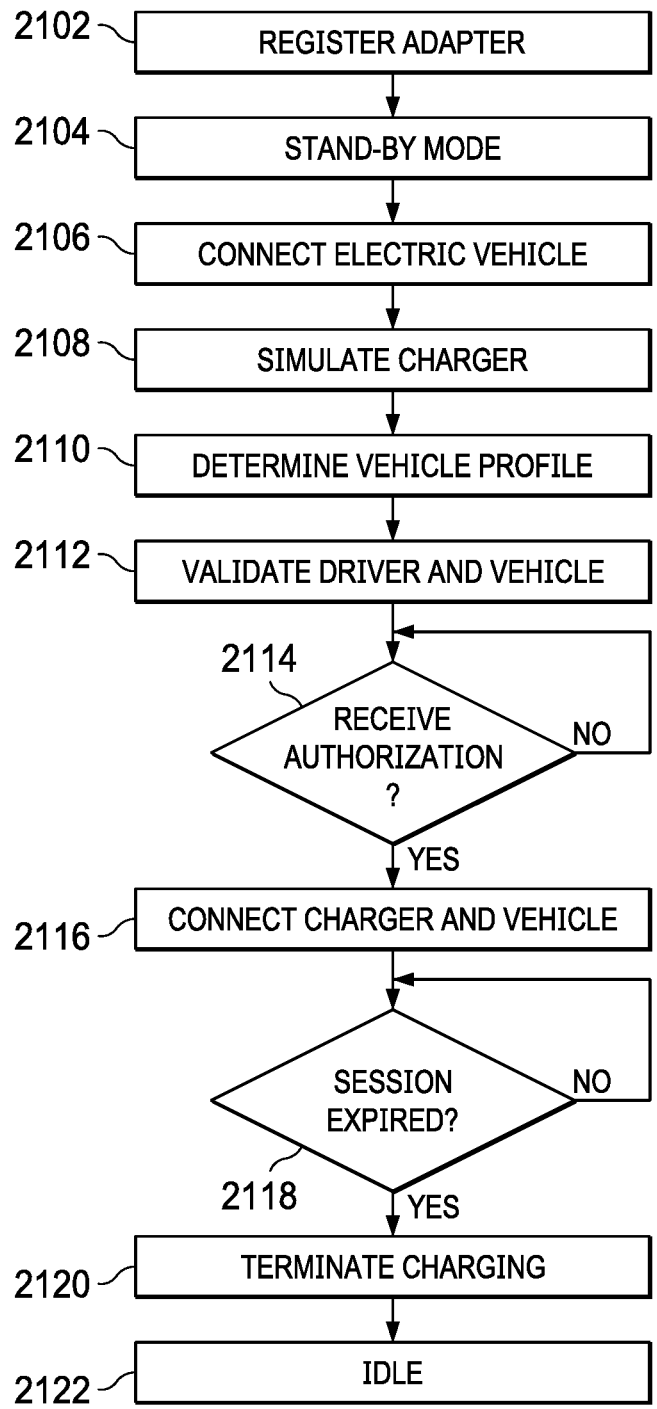
FIG. 21 illustrates a flow diagram of the manner in which the intelligent charging adapter controls a charging process between a charger and an electric vehicle.

Referring now also to FIG. 21, there is illustrated a flow chart more fully describing the operation of the adapter 1702 when connected to a charger 1704. Once communications are established with central server 1712, the RCU 2010 registers the presence and availability of the adapter 1702 in the registry of adapters maintained at the central server 1712 at step 2102. The RCU 2010 next switches the adapter 1702 into standby mode at step 2104 to await the arrival of an electrical vehicle 1708 to connect with the J1772 output interface (JIO) 2018. In this idle state, the adapter 1702 draws its electricity from the internal rechargeable battery 2012 in the PSCU 2014.

When an electric vehicle 1708 arrives at an i-Charger station (an adapter-equipped charger station) for a reservation, a driver of the vehicle will launch a mobile app associated with the charger reservation service such as that described above and obtain validation for a charging session which may have been reserved in advance. The driver next connects the electric vehicle 1708 at step 2106 to the adapter 1702 via the JIO connector 2018, which triggers the RCU 2010 to simulate appearing as a charger to the electric vehicle at step 2108 in order to determine at step 2110 the electric vehicle profile such as make of vehicle and the battery properties. The RCU 2010 then communicates with central server 1712 to validate the driver and electric vehicle at step 2112. Upon receiving authorization for a valid charge at step 2114, the RCU 2010 instructs the EV simulator control unit (ESCU) 2020 to connect the signal line 2022 between the charger 1704 and the electric vehicle 1708 at step 2116. The EV simulator control unit 2020 controls the connection and communications between the charger 1704 and the electric vehicle 1708. While the adapter 1702 is in the idle state this signal line 2022 is open so that the charger 1704 cannot communicate prematurely with the electric vehicle 1708 and enable the adapter 1702 to complete its pre-charge session protocols with the central server 1712 such as to validate and record the charging session, etc. This signal line 2022 is the only switchable line within the adapter 1702 as it is the means of communicating with the EV charger 1704 for controlling the activation or termination of power from the EV charger 1704.

Once the session is authorized the ESCU 2020 acts as a transponder and enables communications between the EV charger 1704 and the electric vehicle 1708 via the signal line 2022. The EV charger 1704 performs its normal charging sequence and detects the type of electric vehicle 1708 and battery to charge and performs a normal charging routine to charge the authorized connected electric vehicle 1708. During electric vehicle 1708 charging the PSCU 2014 will tap power from the charge lines 2024 by inductance, capacitance or other means to recharge the rechargeable battery 2012 of the adapter 1702 which powers the adapter electronics. The PSCU 2014 does not switch the power lines to the EV itself due to the high voltages and current that is typical and which would require bulky relays. While this embodiment describes inductance charging and use of a rechargeable battery 2012 to power the adapter electronics, other means of powering the adapter electronics may be used. The PSCU 2014 manages and distributes the appropriate control power to all the electronics elements in the adapter 1702. Also, while this illustration cites the use of the signal line 2022 for communications between the EV charger 1704 and the electric vehicle 1708, other charging devices and standards may evolve and embody other means of communications between the electric vehicle 1708 and the charger 1704 but the underlying principle of the adapter 1702 acting as an intermediary control mechanism still applies.

During the electric vehicle 1708 charging session the RCU 2010 monitors the connection at step 2118 via the signal line 2022 until its program or the central server 1712 determines that the reservation period has expired and that the charging is to terminate at step 2120. At this point the ESCU 2020 is instructed to break the signal line connection between the electric vehicle 1708 and the EV charger 1704 and take control of the charger's signal line instead. Herein, the ESCU 2020 simulates as the electric vehicle 1708 and instructs the charger 1704 to cut off the charging power to the electric vehicle and the adapter 1702 reverts to its idle position at step 2122 to await the next charging transaction. Besides controlling the connection or disconnection of the signal line 2022 between the EV charger 1704 and the electric vehicle 1708, the ESCU 2020 also performs the EV charging termination sequence according to the charger it is connected to.

Thus, the adapter 1702 serves to turn an ordinary "dumb" standalone EV charger 1704 into an intelligent charger that can broadcast its availability status and also control the charging session of an electric vehicle 1708. The illustration provided above for a J1772 provisioned EV charger 1704 is an illustration of the control functions of the adapter 1702 and its application. The sequence of operation of the functional elements of the adapter 1702 may vary depending on the production design of the adapter 1702 and its application, the various standards in force, and the types of chargers used, but the underlying principal functions of the adapter 1702 as an intermediary control mechanism still apply. The adapter 1702 may be produced to be compatible with different physical packaging. Additionally, the electric vehicle 1708 may comprise an automobile or other type of electric personal mobility device. The system would also be useful in reserving charging stations for charging any other type of electrical device.

It will be appreciated by those skilled in the art having the benefit of this disclosure that this method and device for converting standalone EV charging station into an intelligent charging station provides an easy manner for upgrading existing EV chargers. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An adapter for converting a dumb charger into a smart charger, comprising:
    a first input interface for interconnecting the adapter with a first charging connector of the dumb charger;
    a second input interface for interconnecting the adapter with a second charging connector of an electric device;
    a wireless communications interface for providing wireless connectivity to the adapter, the wireless connectivity initiated responsive to connection of the first input interface with the first charging connector of the dumb charger; and
    control circuitry interconnecting the first input interface with the second input interface via a signaling connection for providing communications between the first input interface and the second input interface, the control circuitry further providing a power connection for selectively providing a charging signal from the first input interface to the second input interface responsive to commands received over the wireless communications interface and the signaling connection.

2. The adapter of claim 1, wherein the control circuitry further includes a simulator control unit for controlling the communications between the first input interface and the second input interface responsive to control signals received from the wireless communications interface.

3. The adapter of claim 2, wherein the simulator control unit further performs an electric device charging termination sequence to discontinue charging of the electric device responsive to commands received over the wireless communications interface.

4. The adapter of claim 2, wherein the control circuitry further includes a power sensing and control unit for controlling the power connection between the first input interface and the second input interface responsive to control signals received from the simulator control unit.

5. The adapter of claim 1, wherein the control circuitry further includes a power sensing and control unit for charging a rechargeable battery for providing power to the adapter using at least one of inductive charging.

6. The adapter of claim 5, wherein the rechargeable battery is a removable battery.

7. The adapter of claim 1, wherein the control circuitry further includes a remote control unit for controlling operation of the adapter responsive to control signals received from a remote server via the wireless communications interface.

8. The adapter of claim 1, wherein the control circuitry simulates operation of the dumb charger to the electric device responsive to connection of the electric device to the second input interface prior to authorization of charging through the wireless communications interface.

9. The adapter of claim 1, wherein the control circuitry registers the dumb charger with a remote server via the wireless communications interface responsive to connection of the dumb charger to the first input interface.

10. The adapter of claim 1, wherein the adapter enters a standby mode upon completion of a registration process and enters a charging mode responsive to connection of the electric device to the second input interface and authorization of charging through the wireless communications interface.

11. A method for converting a dumb charger into a smart charger, comprising:
   detecting connection of an adapter with a first charging connector of the dumb charger at a first input interface;
   detection connection of the adapter with a second charging connector of an electric device at a second input interface;
   simulating operation of the dumb charger to the electric device responsive to connection with the electric device;
   providing wireless connectivity to the adapter responsive to detection of connection of the first input interface with the first charging connector of the dumb charger via a wireless communications link;
   interconnecting the first input interface with the second input interface via a signaling connection for providing communications between the first input interface and the second input interface; and
   selectively providing a power connection between the first input interface and the second input interface for selectively providing a charging signal from the first input interface to the second input interface responsive to commands received over a wireless communications interface and the signaling connection.

12. The method of claim 11 further comprising controlling the communications between the first input interface and the second input interface responsive to control signals received from the wireless communications interface.

13. The method of claim 12 further comprising:
   receiving commands over the wireless communications interface; and
   performing an electric device charging termination sequence to discontinue charging of the electric device responsive to the commands received over the wireless communications interface.

14. The method of claim 11, further comprising controlling the power connection between the first input interface and the second input interface.

15. The method of claim 11 further comprising charging a rechargeable battery, for providing power to the adapter using at least one of capacitive or inductive charging.

16. The method of claim 15, wherein the rechargeable battery is a removable battery.

17. The method of claim 11 further comprising controlling operation of the adapter responsive to control signals received from a remote server via the wireless communications interface.

18. The method of claim 11, wherein the step of simulating further comprises:
   detecting connection of the electric device to the second input interface; and
   simulating operations of the dumb charger to the electric device responsive to detection of connection of the electric device to the second input interface prior to authorization of charging through the wireless communications interface.

19. The method of claim 11 further comprising:
   detecting connection of the dumb charger to the first input interface; and
   registering the dumb charger with a remote server via the wireless communications interface responsive to detection of the connection of the dumb charger to the first input interface.

20. The method of claim 11 further comprising:
   entering the adapter into a standby mode upon completion of a registration process;
   detecting connection of the electric device to the second input interface; and
   entering the adapter into a charging mode responsive to connection of the electric device to the second input interface.

21. A system, comprising:
   a plurality of adapters for converting a dumb charger into a smart charger having remote network communications connectivity and control, each of the plurality of adapters plugged into a charging connector of an associated dumb charger, each of the adapters comprising:
      a first input interface for interconnecting the adapter with a first charging connector of the associated dumb charger;
      a second input interface for interconnecting the adapter with a second charging connector of an electric device;
      a wireless communications interface for providing wireless connectivity to the adapter, the wireless connectivity initiated responsive to connection of the first input interface with the first charging connector of the associated dumb charger;
      control circuitry interconnecting the first input interface with the second input interface via a signaling connection for providing communications between the first input interface and the second input interface, the control circuitry simulating operation of the associated dumb charger to the electric device responsive to connection with the electric device, the control circuitry further providing a power connection for selectively providing a charging signal from the first input interface to the second input interface responsive to commands received over the wireless communications interface and the signaling connection; and
   a control server remotely located from and connected to each of the plurality of adapters via wireless communications links wherein the control server controls validation of users attempting to charge the electric device and controls the charging of the electric device using commands sent to the plurality of adapters via the wireless communications links.

22. The system of claim 21, wherein the control circuitry registers the dumb charger with the control server via the wireless communications interface responsive to connection of the dumb charger to the first input interface.

23. The system of claim 21, wherein each of the plurality of adapters enter a standby mode upon completion of a registration process with the control server and enters a charging mode responsive to connection of the electric device to the second input interface.

24. A system comprising
   a plurality of adapters for converting a dumb charger within a mobile charging station into a smart charger within the mobile charging station having remote network communications connectivity and control, each of the plurality of adapters plugged into a charging connector of an associated dumb charger of the mobile charging station, each of the adapters comprising:

a first input interface for interconnecting the adapter with a first charging connector of the associated dumb charger within the mobile charging station;

a second input interface for interconnecting the adapter with a second charging connector of an electric vehicle;

a wireless communications interface for providing wireless connectivity to the adapter, the wireless connectivity initiated responsive to connection of the first input interface with the first charging connector of the associated dumb charger within the mobile charging station; and control circuitry interconnecting the first input interface with the second input interface via a signaling connection for providing communications between the first input interface and the second input interface, the control circuitry further providing a power connection for selectively providing a charging signal from the first input interface to the second input interface responsive to commands received over the wireless communications interface and the signaling connection; and a control server remotely located from and connected to each of the plurality of adapters via wireless communications links, the control server further including an artificial intelligence system (AIS) to manage the mobile charging stations over a wireless connection and to provide dynamic scheduling of a charging rendezvous between the electric vehicle and the mobile charging station, wherein the control server controls validation of users attempting to charge the electric vehicle and controls the charging of the electric vehicle using commands sent to the plurality of adapters via the wireless communications links.

* * * * *